US009621562B2

(12) United States Patent
Furuichi et al.

(10) Patent No.: US 9,621,562 B2
(45) Date of Patent: Apr. 11, 2017

(54) PROPAGATING AUTHENTICATION BETWEEN TERMINALS

(71) Applicant: International Business Machines Corporation, Armonk, NY (US)

(72) Inventors: Sanehiro Furuichi, Tokyo (JP); Takahito Tashiro, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/652,181

(22) PCT Filed: Jan. 14, 2014

(86) PCT No.: PCT/JP2014/050477
§ 371 (c)(1),
(2) Date: Jun. 15, 2015

(87) PCT Pub. No.: WO2014/115605
PCT Pub. Date: Jul. 31, 2014

(65) Prior Publication Data
US 2016/0006745 A1 Jan. 7, 2016

(30) Foreign Application Priority Data

Jan. 28, 2013 (JP) ................................ 2013-013280

(51) Int. Cl.
*H04L 29/00* (2006.01)
*H04L 29/06* (2006.01)
(Continued)

(52) U.S. Cl.
CPC ............ *H04L 63/105* (2013.01); *G06F 21/31* (2013.01); *G06F 21/41* (2013.01); *H04L 63/08* (2013.01);
(Continued)

(58) Field of Classification Search
CPC ......... H04L 63/08; H04L 63/10; G06F 21/03; G06F 21/44
(Continued)

(56) References Cited

U.S. PATENT DOCUMENTS 7,620,978 B1 * 11/2009 Reddy .................... G06F 21/41
713/168
8,365,249 B1 * 1/2013 Cope ..................... H04W 12/06
713/150
(Continued)

FOREIGN PATENT DOCUMENTS

JP      2006099217 A    4/2006
JP       3878974 B1    2/2007
(Continued)

OTHER PUBLICATIONS

International Search Report (Japan), International Application No. PCT/JP2014/050477, Date of Mailing: Apr. 1, 2014, pp. 1-2.
(Continued)

*Primary Examiner* — Madhuri Herzog
(74) *Attorney, Agent, or Firm* — David Zwick

(57) ABSTRACT

Propagating authentication between terminals connected to a server having identification information and user information for the terminals. The terminal receives identification information, user information, location information and a login status from a first terminal and a second terminal in response to a predetermined impact between the terminals, or the terminals coming within a predetermined distance of each other, the login status of the terminals being either authenticated or unauthenticated. The server then authenticates the second terminal in response to the users of the first terminal matching some or all of the users of the second terminal based on the identification and user information, in response to the terminals being located within a predetermined distance of each other, and in response to the first (Continued)

terminal being authenticated and the second terminal being unauthenticated on the basis of the login status.

17 Claims, 20 Drawing Sheets

(51) Int. Cl.
*G06F 21/31* (2013.01)
*G06F 21/41* (2013.01)
*H04W 12/06* (2009.01)

(52) U.S. Cl.
CPC ..... *H04W 12/06* (2013.01); *G06F 2221/2105* (2013.01); *G06F 2221/2111* (2013.01)

(58) Field of Classification Search
USPC .......................... 726/1–10, 21; 713/168–186
See application file for complete search history.

(56) References Cited

U.S. PATENT DOCUMENTS

| | | | |
|---|---|---|---|
| 8,761,809 B2* | 6/2014 | Faith | G06F 1/1694 455/406 |
| 2006/0224882 A1 | 10/2006 | Chin | |
| 2007/0162963 A1* | 7/2007 | Penet | G06F 21/41 726/5 |
| 2011/0225426 A1 | 9/2011 | Agarwal et al. | |
| 2014/0189789 A1* | 7/2014 | Lewis | H04L 63/08 726/3 |

FOREIGN PATENT DOCUMENTS

| | | |
|---|---|---|
| JP | 2007219935 A | 8/2007 |
| JP | 2007328674 A | 12/2007 |
| JP | 2008097203 A | 4/2008 |
| JP | 2008191875 A | 8/2008 |
| JP | 2008243196 A | 10/2008 |
| JP | 2009239431 A | 10/2009 |
| JP | 2010165264 A | 7/2010 |
| JP | 2011133951 A | 7/2011 |
| JP | 2012165061 A | 8/2012 |
| WO | 03053007 A1 | 6/2003 |
| WO | 2014115605 A1 | 7/2014 |

OTHER PUBLICATIONS

Application No. 2013-013280 (Japan), titled "Method for Propagating Authentication between Terminals, and Server and Computer Program Therefor," filed on Jan. 28, 2013, pp. 1-78.
Griffin, "Desktop Security: Create Custom Login Experiences With Credential Providers for Windows Vista," Microsoft Corporation, http://msdn.microsoft.com/en-us/magazine/cc163489.aspx, Accessed on Mar. 23, 2015, pp. 1-9.
Brown, "Security Briefs: Customizing GINA, Part 1," Microsoft Corporation, http://msdn.microsoft.com/enus/magazine/cc163803.aspx, Accessed on Mar. 23, 2015, pp. 1-6.
Bump Technologies, Inc., "The Bump App for iPhone and Android; Frequently Asked Questions," http://bu.mp/company/faq, Accessed on Dec. 8, 2012, pp. 1-4.
Itoh et al., "Liberty ID-WSF Multi-Device SSO Deployment Guide," Liberty Alliance Project, Version 1.0-02, 2008, pp. 1-13.
IBM, "Tivoli Access Manager for Enterprise Single Sign-on," TAM ESSO—Japan, http://www.06.ibm.com/software/jp/tivoli/products/pentio, Accessed on Jan. 18, 2013, pp. 1-1.
IBM, "IBM Security Access Manager for Enterprise Single Sign-On," http://www-03.ibm.com/software/products/en/access-mgr-esso, Accessed on Jun. 12, 2015, pp. 1-2.
IBM, "Using Tivoli Access Manager Enterprise Single Sign-on with IBM Middleware," http://www.ibm.com/developerworks/tivoli/library/t-tamessomid/, Accessed on Jun. 15, 2015, pp. 1-11.

* cited by examiner

| Identification Information | User Information | |
|---|---|---|
| R9H5V4B | User A | 1031 |
| WOH6V5A | User A | 1032 |
| A275501700017559 | User A, User B | 1033 |
| 9C940KZ6H56K4 | Group 1* | 1034 |
| APYHRO00166 | User B | 1035 |

* Group 1 includes Users A, B, C and D.

PROPAGATING AUTHENTICATION BETWEEN TERMINALS

BACKGROUND

The present invention relates to the management of terminals, such as portable terminals. The present invention relates more specifically to managing and improving the security of these devices. The present invention relates even more specifically to a technique for propagating authentication between a plurality of terminals connectable to a server via a network.

Services using the internet to manage personal information such as names, addresses and telephone numbers and to manage payment information such as credit card numbers and expiration data have proliferated. Authenticating the users of these services is critically important from the standpoint of security.

In order to prevent the divulging of sensitive information from portable terminals such as smartphones, mobile phones, tablets, personal digital assistants (PDAs), notebook computers and gaming consoles, users are prompted during login to set a strong password, which is a password of a predetermined length which combines letters and numbers. However, in order to avoid the hassle of having to frequently enter such a password into a portable terminal, lock timers with a long period of time are often installed or easy passwords set. In such an environment, the risk of sensitive information such as personal information or payment information being divulged from a portable terminal is higher.

Multiple terminals (such as portable terminals and desktop computers) are often used in a business setting. Individual passwords are usually established for each device. This means a user has to enter a password each time a terminal is used, which may make using these devices burdensome.

Japanese laid-open Patent Publication No. 2010-165264 describes a method for synchronizing data stored in a plurality of portable terminals via a synchronizing server device connected to and communicating with each terminal (claim 1). FIG. 2 (a) in the patent publication shows how data is synchronized by placing mobile phone 11a and mobile phone 11b together and shaking them (paragraphs 0037 and 0041-0086), and FIG. 2 (b) in the same document shows how data is synchronized by bringing mobile phone 12a and mobile phone 12b into contact with each other (paragraphs 0038 and 0087-0097).

Japanese laid-open Patent Publication No. 2011-133951 describes an authentication inheriting system in which an authentication session ID for uniquely identifying the authentication of a user in the system managed with the user's ID for a wired or wireless communication environment connected to a predetermined terminal which the user may switch to and use at a later time. When the user has switched environments, the environment ID is acquired, and the user's authentication in the previous environment is acquired from the authentication session ID connected to the environment ID (paragraph 0011).

Japanese laid-open Patent Publication No. 2009-239431 describes an intermediation system in which there are two terminals desiring intermediation for communication and a server connected to the terminals via a network. The two terminals send an intermediation request to the server which includes the proximity determining information acquired by each terminal for determining the proximity of the terminals to each other and identification information related to the terminals. When the intermediation request has been received, the server compares the proximity determining information from the two terminals. When the terminals are close to each other, the server generates a predetermined authentication code, and replies to the two terminals. When authentication results are received from the two terminals indicating that the authentication codes matched, intermediation is performed between the two terminals (claim 1).

Japanese laid-open Patent Publication No. 2007-219935 describes a distribution system for distributed authentication management that allows for continuous use of a service and reduces the number of times a user has to perform authentication even when a terminal including more than one communication means changes communication means while a service is being provided (abstract).

Japanese laid-open Patent Publication No. 2008-097203 describes a method for locking the operation of a personal computer when a user is away from his or her seat (abstract).

Japanese laid-open Patent Publication No. 2007-328674 describes a method that reliably prevents information leaks and tampering with a portable memory device as well as unauthorized use of a portable memory device, and that reliably prevents unauthorized connection of a portable memory device to a network by a third party (abstract).

Japanese laid-open Patent Publication No. 2006-099217 describes a method for preventing unauthorized use of an IC card, and that notifies a user that the card has been left behind or stolen (abstract).

Online document "The Bump App for iPhone and Android", published by Apple, Inc., describes an application that allows contact information, photographs, messages, music, SNS contacts and event calendars to be shared simply by grasping the terminals and bumping them together.

Document "Liberty ID-WSF Multi-Device SSO Deployment Guide Version: 1.0-02", published by Liberty Alliance Project, 2008, describes how an SSO (single sign on) is inherited when a user switches communication devices.

SUMMARY OF INVENTION

It is an object of the present invention to provide a technique for strong passwords to be established for a plurality of terminals, while also allowing the terminals to be used without the user having to enter a password every time one of the terminals is used.

The present invention provides a technique for propagating authentication between a plurality of terminals connected via a network to a server (terminal management system) having identification information and user information for the terminals. This technique includes a method for propagating authentication between terminals connected to the server, the server itself, and a computer program and computer program product executable by the server.

In one embodiment, a method is disclosed in which a server executes the steps of: receiving identification information, user information, location information and a login status from each of a first terminal and a second terminal in response to a predetermined impact between the first terminal and the second terminal, or the first terminal and the second terminal coming within a predetermined distance of each other, the login status of the terminals being either authenticated or unauthenticated; and authenticating the second terminal in response to the users of the first terminal matching some or all of the users of the second terminal on the basis of the identification information and user information, in response to the first terminal and the second terminal being located within a predetermined distance of each other on the basis of the location information, and in response to the first terminal being authenticated and the second terminal being unauthenticated on the basis of the login status.

In one aspect, the method includes the first terminal executing the step of authenticating the first terminal in response to a user of the first terminal authenticating the first terminal prior to the receiving step.

In another embodiment, a server is disclosed that includes: a receiving means for receiving identification information, user information, location information and a login status from each of a first terminal and a second terminal in response to a predetermined impact between the first terminal and the second terminal, or the first terminal and the second terminal coming within a predetermined distance of each other, the login status of the terminals being either authenticated or unauthenticated; and an authenticating means for authenticating the second terminal in response to the users of the first terminal matching some or all of the users of the second terminal on the basis of the identification information and user information, in response to the first terminal and the second terminal being located within a predetermined distance of each other on the basis of the location information, and in response to the first terminal being authenticated and the second terminal being unauthenticated on the basis of the login status.

In one aspect, the receiving means may receive acceleration sensor information from each of the first terminal and the second terminal in response to a predetermined impact between the first terminal and the second terminal.

In one aspect, the impact between the first terminal and the second terminal occurs when the first terminal and second terminal come into contact or collide with each other.

In one aspect, the first terminal and the second terminal coming within a predetermined distance of each other may be the range in which the first terminal can detect the second terminal using radio frequency identification (RFID), infrared or ultrasound.

In one aspect, the first terminal and the second terminal coming within a predetermined distance of each other may be the range in which the first terminal and the second terminal can communicate with each other using wireless communication devices.

In one aspect, the first terminal and the second terminal coming within a predetermined distance of each other may be the range in which the first terminal can read a barcode displayed on a screen of the second terminal.

In one aspect, the receiving means may receive, from the first terminal, bar code information displayed on a screen of the second terminal and read by the first terminal, and receive, from the second terminal, the barcode information displayed on the screen of the second terminal. In one aspect of the present invention, the authenticating means authenticates the second terminal in response to the barcode information received from the first terminal matching the barcode information received from the second terminal.

In one aspect, the users of the first terminal match some or all of the users of the second terminal, and the user of the first terminal is the same as the user of the second terminal, or the user of the first terminal and the user of the second terminal belong to the same group.

In another embodiment, a computer program product is disclosed for executing in the server each of the steps of the method according to any aspect of the present invention.

A computer program for executing functions to propagate authentication between terminals connectable to a server via a network according to the present embodiment can be stored on any computer-readable recording medium, including a flexible disk, MO, CD-ROM, DVD, BD, hard disk device, USB memory, ROM, MRAM or RAM. The computer program can also be downloaded from another data processing system connected to a communication network for storage on a recording medium, or can be copied from another recording medium. The program can also be compressed, divided into a plurality of programs, and recorded on one or more recording media. A computer program product embodying the present invention can take a variety of forms. The computer program product can include, for example, the recording medium on which the computer program is stored or a transmission medium over which the computer program is transmitted.

The summary of the embodiments provided above is not intended to enumerate all of the required features of the present invention, and it is to be understood that embodiments of present invention may include all combinations and sub-combinations of these constituent elements.

It should also be clear that a person of skill in the art could conceive of various changes such as combining a plurality of machines and allocating functions to these machines to embody the hardware elements of the information processing device used in the embodiment of the present invention. These changes are encompassed within the concept of the present invention. However, these elements are for illustrative purposes only, and all of the elements are not essential elements of the present invention.

Also, the embodiments of the present invention can be realized by hardware, software, or a combination of hardware and software. When the embodiments are executed by a combination of hardware and software, it is typically executed by a device in which the computer program has been installed. Here, the computer program is downloaded to the memory of the device and executed. The computer program then controls the device and executes the processing of the present invention. This computer program can be configured from groups of instructions expressed in any language, code or notation. The device can execute the specific functions in the group of instructions immediately, or after (1) converting the group of instructions into another language, code or notation, and/or (2) copying the group of instructions to another medium.

In an embodiment of the present invention, when a user uses more than one device, the user authenticates one of the terminals by entering a password directly into that device. When the authenticated device impacts the other device or when the device is brought within a predetermined distance of the other device, the other device is automatically authenticated without the user having to enter a password into the other device. In other words, the other device is automatically unlocked without the user having to enter a password into the other device. Stated another way, the authentication of one device is propagated from the one device to another device. Because the user entered a password into the first device he or she used, the user does not have to enter a password into a plurality of devices every time one of those devices is used and does not have to release the authentication in an unused device. Thus, the embodiment of the present invention improves user convenience.

Also, in an embodiment of the present invention, once authentication has been propagated, a stationary device can be automatically locked when the user leaves carrying another device. Thus, the embodiment of the present invention ensures terminal security.

Also, in an embodiment of the present invention, once authentication has been propagated, a device can be automatically deauthenticated when the user authenticates another device by directly entering a password into the device. In other words, the device is automatically locked. Thus, the embodiment of the present invention reduces the risk of sensitive data being leaked even when the terminal is stolen.

DETAILED DESCRIPTION

The following is a description of an embodiment of the present invention with reference to the drawings. Identical elements are denoted by the same reference symbols in all of the drawings unless otherwise indicated. The following is a description of a preferred embodiment of the present invention, and it should be understood that there is no intention to limit the scope of the present invention to what is described herein.

Figure 1:
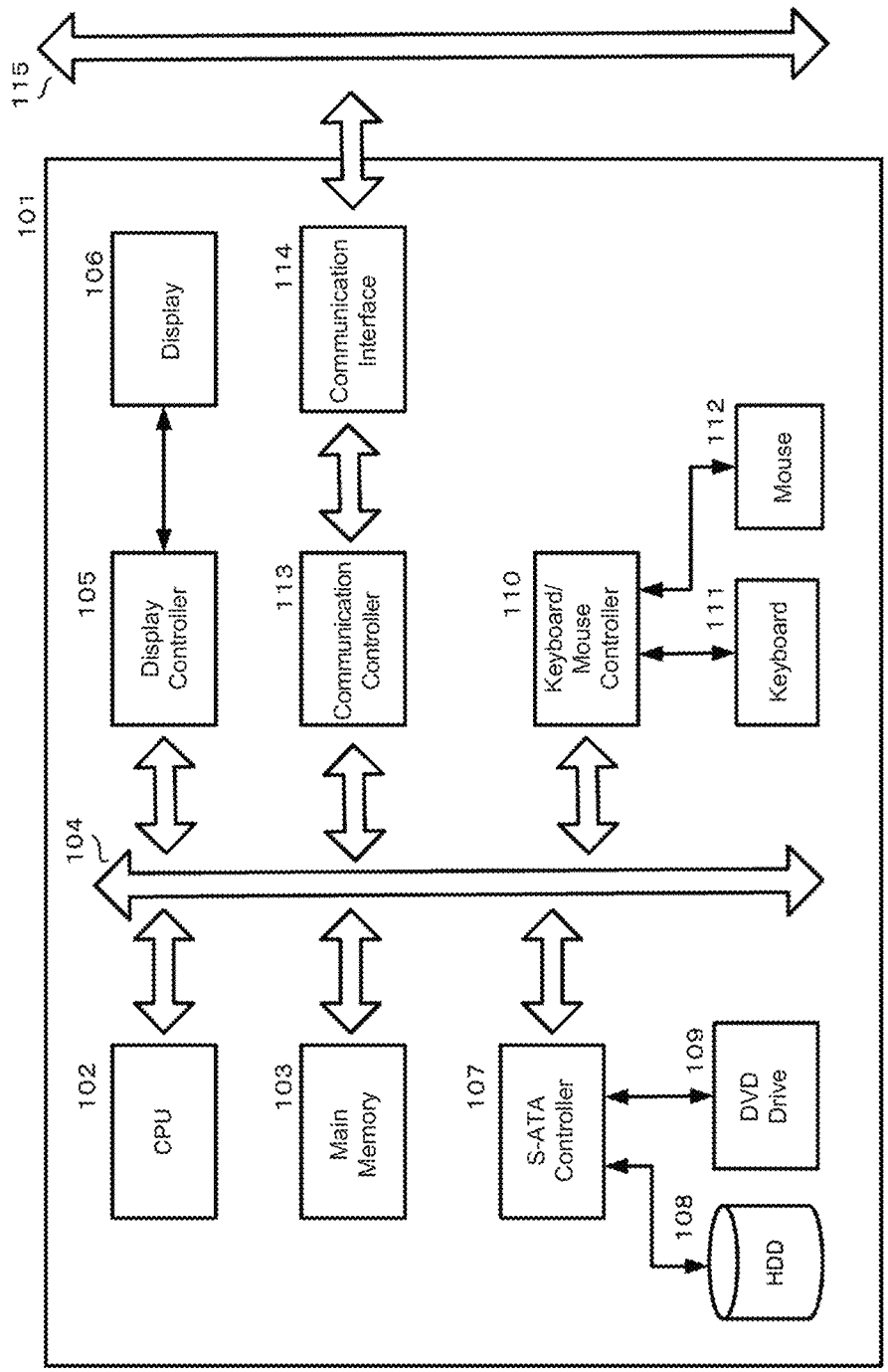
FIG. 1 is a diagram showing an example of a hardware configuration used to realize a server for propagating authentication between terminals according to an embodiment of the present invention.

FIG. 1 is a diagram showing an example of a hardware configuration used to realize a server (terminal management system) for propagating authentication between terminals according to an embodiment of the present invention. The server (101) includes a central processing unit (CPU) (102) and a main memory (103), and these are connected to a bus (104). The CPU (102) is preferably based on a 32-bit or 64-bit architecture. Examples that can be used include the Power (trademark) series from International Business Machines Incorporated, the Core i (trademark) series, Core 2 (trademark) series, Atom (trademark) series, Xeon (trademark) series, Pentium (registered trademark) series or Celeron (registered trademark) series from Intel Corporation, the A series, Phenom (trademark) series, Athlon (trademark) series, Turion (trademark) series, or Sempron (trademark) from Advanced Micro Devices, and the A series from Apple Computer (registered trademark). A display (106) such as a liquid crystal display (LCD) may be connected to the bus (104) via a display controller (105). The display (106) may be used to control the server and to display on an appropriate graphic interface information from a server connected to the network via a communication line and information related to the software running on the server. A disk (108), such as a silicon disk or hard disk, may be connected to the bus (104) via a SATA or IDE controller (107). A drive such as a CD, DVD or BD drive, may also be connected to the bus (104) via a SATA or IDE controller (107). A keyboard (111) and mouse (112) may be optionally connected to the bus (104) via a keyboard/mouse controller (110) or USB bus (not shown).

An operating system such as Windows (registered trademark), UNIX (registered trademark), MacOS (registered trademark), a Java (registered trademark) processing environment such as J2EE, Java (registered trademark) applications, Java (registered trademark) virtual machines (VM), and Java (registered trademark) just-in-time (JIT) compilers, as well as other programs and data, may be stored on the disk (108) for download to the main memory (103).

If necessary, a drive (109) may be used to install a program such as an operating system or application on the disk (108) from a CD-ROM, DVD-ROM or BD.

The communication interface (114) can use, for example, an Ethernet (registered trademark) protocol. The communication interface (114) is connected to a bus (104) via a communication controller (113), and functions to physically connect the server (101) to the communication network (115). This provides a network interface layer for the TCP/IP communication protocol in the communication function of the operating system of the server (101). The communication line can operate in a wired LAN environment or a wireless LAN environment based, for example, on a wireless LAN standard such as IEEE 802.11a, b, g, n, i, j, ac, ad, or on Long-Term Evolution (LTE).

The server can be any type of computer as long as a computer program according to the present invention can be installed. Examples include a blade server, rack-mounted server, PC server or mainframe computer.

FIG. 2A and FIG. 2B, FIG. 3A and FIG. 3B, and FIG. 4A and FIG. 4B are flowcharts and illustrations of flowchart details showing the processing according to an embodiment of the present invention executed by a server, Terminal A and Terminal B in order to propagate authentication between Terminal A and Terminal B connectable to the server via a network as shown in FIG. 1.

The server stores identification information for Terminal A, user information for Terminal A, identification information for Terminal B, and user information for Terminal B. The identification information and user information for both devices is stored by the manager of the devices in, for example, a terminal/user management database (DB) (see the terminal/user management database (1002) in FIG. 10A).

There are no particular restrictions on the identification information for the terminals as long as the identification information can uniquely identify each device. In other words, the identification information for each terminal can be anything that identifies each terminal. The identification information for a terminal can be the serial number (S/N) of the terminal, the serial number (S/N) of certain hardware inside the terminal (for example, the CPU, hard disk or SSD), the MAC address of the terminal, or the name of the terminal. The serial number (S/N) of the terminal may be the terminal serial number, individual identification information, the serial number of the carrier card of a mobile phone, or a subscriber ID. The serial number (S/N) of the terminal is preferred from the standpoint of security, because the MAC address or name of a terminal can be changed. However, the MAC address or name of the terminal can be used as the identification information if modifications have been made so that the MAC address or name of the terminal cannot be changed.

There are no particular restrictions on the user information for the terminals as long as the information is able to uniquely identify users of each terminal. In other words, the user information for each terminal can be anything that identifies the users of each terminal. The user information for the terminals may be information associated with users and registered with a server or managed by a server. The information registered with a server or managed by a server may be information enabling users to log into a server. The information enabling users to log into a server may be a name determined by the manager; an ID, password or combination of these; the users name (full name) or nickname; or the name of the group or the name of the network that the user belongs to.

In the example shown in the flowchart, there are only two terminals: Terminal A and Terminal B. However, there may be three or more terminals as well. Also, the terminals are portable terminals and desktop personal computers, but the terminals are not limited to these. The portable terminals may be smartphones, mobile phones, tablets, personal digital assistance (PDAs), notebook personal computers, and gaming terminals. However, the terminals are not limited to these examples. Terminal A and Terminal B may be terminals of the same type or different types. Any combination of terminals can be used.

Figure 2A:
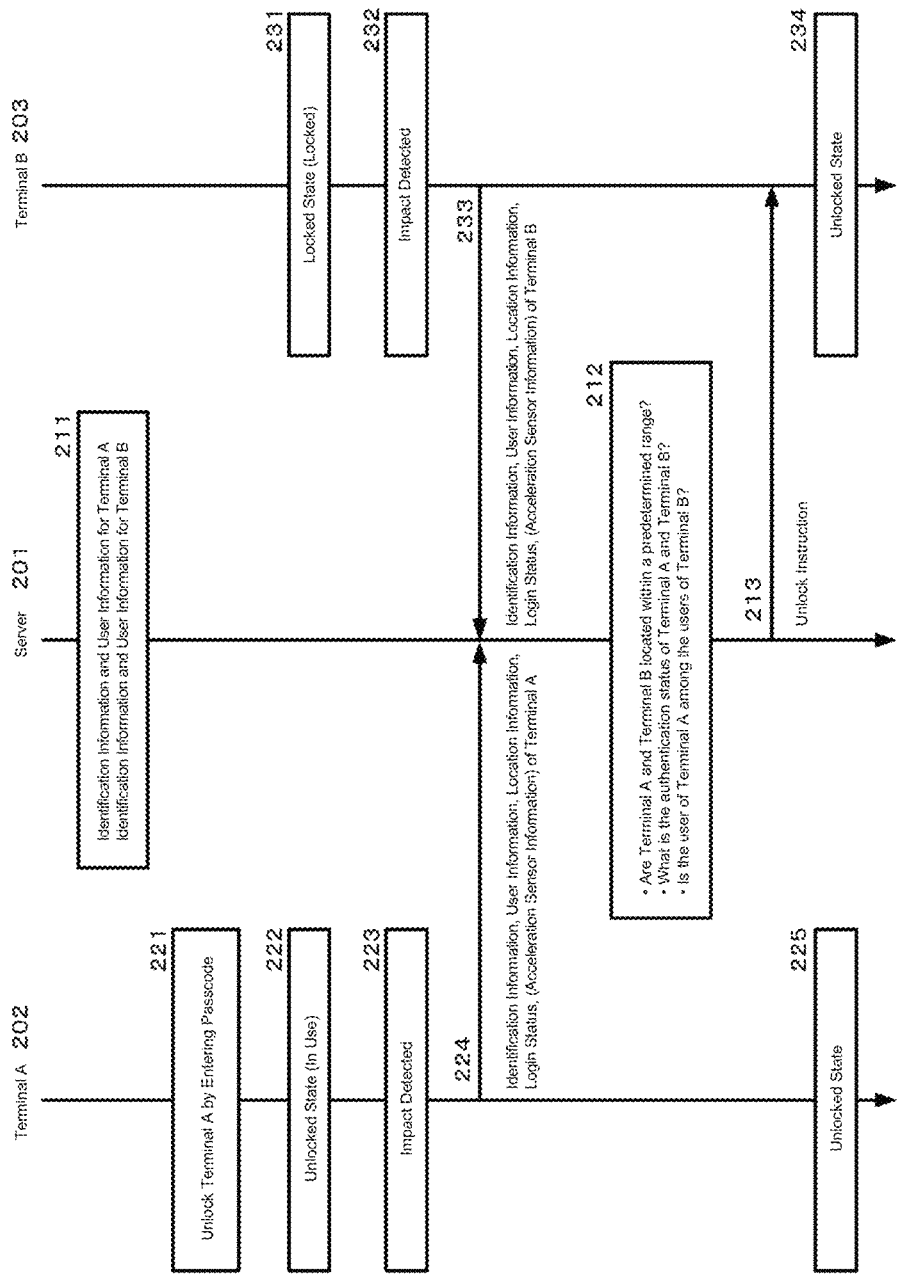
FIG. 2A is a flowchart showing processing according to an embodiment of the present invention which is executed by a server, Terminal A and Terminal B in order to propagate authentication between Terminal A and Terminal B connectable to the server via a network.

FIG. 2A is a flowchart showing processing according to an embodiment of the present invention which is executed by a server (201), Terminal A (202) and Terminal B (203) in order to propagate authentication between Terminal A (202, the terminal propagating the authentication) and Terminal B (203, the terminal to which authentication is being propagated) connected to the server (201) via a network.

The server (201) has a management DB including identification information for Terminal A (202), user information for Terminal A (202), identification information for Terminal B (203), and user information for Terminal B (203) (Step 211).

User A enters a password directly into Terminal A (202) to unlock Terminal A (202) (Step 221).

In response to the user entering the password, Terminal A (202) becomes unlocked (authenticated) (Step 222). Unlocking means the password lock on the terminal has been released, and the terminal has become available to the user. Terminal B (203) is locked (unauthorized) (Step 231). Locked means the password lock on the terminal remains engaged (locked), and the terminal is not available to the user.

User A wishes to use Terminal B (203) as well. User A brings Terminal A (202) into contact with Terminal B (203) or makes them collide with each other to create a predetermined impact. The contact may be direct contact between Terminal A and Terminal B which generates a predetermined equipotential. This equipotential can be measured by a equipotential contact measuring device. The collision may be a direct collision between Terminal A and Terminal B, a direct collision between the hand of the user holding Terminal A and Terminal B, a direct collision between Terminal A and the hand of the user holding Terminal B, or a collision between the hand of the user holding Terminal A and the hand of the user holding Terminal B. The collision has to be a collision of a magnitude great enough to be measurable by an acceleration sensor. The user may set the minimum detection limit of the size of the collision at any level for the acceleration sensor.

In response to detecting a predetermined impact (Step 223), Terminal A (202) sends the identification information, user information, location information and login status (authenticated) of Terminal A (202) to the server (201) (Step 224). In response to detecting a predetermined impact (Step 223), Terminal A (202) may optionally send acceleration sensor information to the server (201) (Step 224). As mentioned earlier, the terminal identification information is any information able to uniquely identify the terminal. The location information of the terminal may be absolute coordinates obtained from the Global Positioning System (GPS), the access point used by the Terminal A (202) to connect to the network (for example, a wireless LAN access point), or base station information for a mobile phone. The login status of the terminal is either authenticated or unauthenticated. As mentioned earlier, the user information for the terminal is any information able to uniquely identify the users of the terminal.

In response to detecting a predetermined impact (Step 232), Terminal B (203) sends the identification information, user information, location information and login status (unauthenticated) of Terminal B (203) to the server (201) (Step 233). In response to detecting a predetermined impact (Step 232), Terminal B (203) may optionally send acceleration sensor information to the sensor (201) (Step 233). The transmission of information to the server in Step 224 and the transmission of information to the server in Step 233 do not have to be simultaneous. However, both transmissions have to occur within a predetermined period of time.

The server (201) receives the information from Terminal A (202) and Terminal B (203), and determines the following (Step 212).

The server (201) uses the identification information from Terminal A (202) to determine whether or not Terminal A (202) is a terminal managed by the server. It may determine whether Terminal A (202) is a terminal managed by the server by determining whether the identification information from Terminal A (202) is in the management DB. Similarly, the server (201) uses the identification information from Terminal B (203) to determine whether or not Terminal B (203) is a terminal managed by the server. It may determine whether Terminal B (203) is a terminal managed by the server by determining whether the identification information from Terminal B (203) is in the management DB. When it has been determined that both Terminal A (202) and Terminal B (203) are managed by the server, the server (201) may perform the following determinations. When it has been determined that Terminal A (202) and/or Terminal B (203) is not managed by the server, the server (201) may not make the following determinations.

The server (201) may identify a pattern for authentication propagation from Terminal A (202) to Terminal B (203) using the login status from Terminal A (202) (authenticated) and the login status from Terminal B (203) (unauthenticated).

The server (201) determines whether or not the user of Terminal A (202, the terminal propagating authentication) is included among the users of Terminal B (203, the terminal to which authentication is to be propagated) using the user information from Terminal A (202), the user information from Terminal B (203), and optionally a propagation pattern. The determination whether the user of Terminal A is included among the users of Terminal B may be performed by determining whether the users of Terminal A are among some or all of the users of Terminal B (that is, whether or not there is a match), or by determining whether the users of Terminal A and the users of Terminal B belong to the same group, for example, the same department or the same section in a company.

The server (201) determines whether Terminal A (202) and Terminal B (203) are within a predetermined range using location information from Terminal A (202) and location information from Terminal B (203).

The server (201) may optionally identify whether Terminal A (202) and Terminal B (203) have collided with each other using acceleration sensor information from Terminal A (202) and acceleration sensor information from Terminal B (203). When Terminal A (202) and Terminal B (203) have collided with each other, acceleration sensor information with the same waveform pattern is obtained from both Terminal A (202) and Terminal B (203). Therefore, when the acceleration sensor information from Terminal A (202) and the acceleration sensor information from Terminal B (203) is different, it indicates that Terminal A (202) and Terminal B (203) have not struck each other, that is, Terminal A has struck an object other than Terminal B. The server (201) may optionally use acceleration sensor information from Terminal A (202) and acceleration sensor information from Terminal B (203) to determine that Terminal A (202) and Terminal B (203) are moving in tandem. Acceleration sensor information may be used to determine whether terminals are close to each other when the location information is not precise.

The server (201) optionally sends an instruction to unlock Terminal B (203) in response to determining, on the basis of information from both Terminal A (202) and Terminal B (203), that a user with authorization to use both Terminal A (202) and Terminal B (203) has used Terminal A (202) to strike Terminal B (203) (Step 213). When the server (201) possesses the password for unlocking Terminal B (203) (preferably, encrypted using the public key of Terminal B (203)), it sends the password to Terminal B (203). When the server (201) does not possess the password for unlocking Terminal B (203), the server (201) may send an unlock command to Terminal B (203).

When Terminal B (203) receives an unlock command from the server (201), Terminal B (203) unlocks itself (Step 234). When Terminal B (203) receives an unlock password from the server (201) and the password is encrypted using the public key of Terminal B (203), the encrypted password may be decrypted using the private key of Terminal B (203). Alternatively, when Terminal B (203) is holding the encrypted password for unlocking Terminal B (203), the encrypted password may be decrypted. Alternatively, Terminal B (203) may receive an unlock command from the server (201), activate a login management module, and automatically perform the unlocking process (see FIG. 11B).

Terminal A (202) remains unlocked (Step 225).

Authorization is propagated from Terminal A (202) to Terminal B (203) in this manner. Thus, user A can unlock Terminal B (203) without entering a password.

Figure 2B:
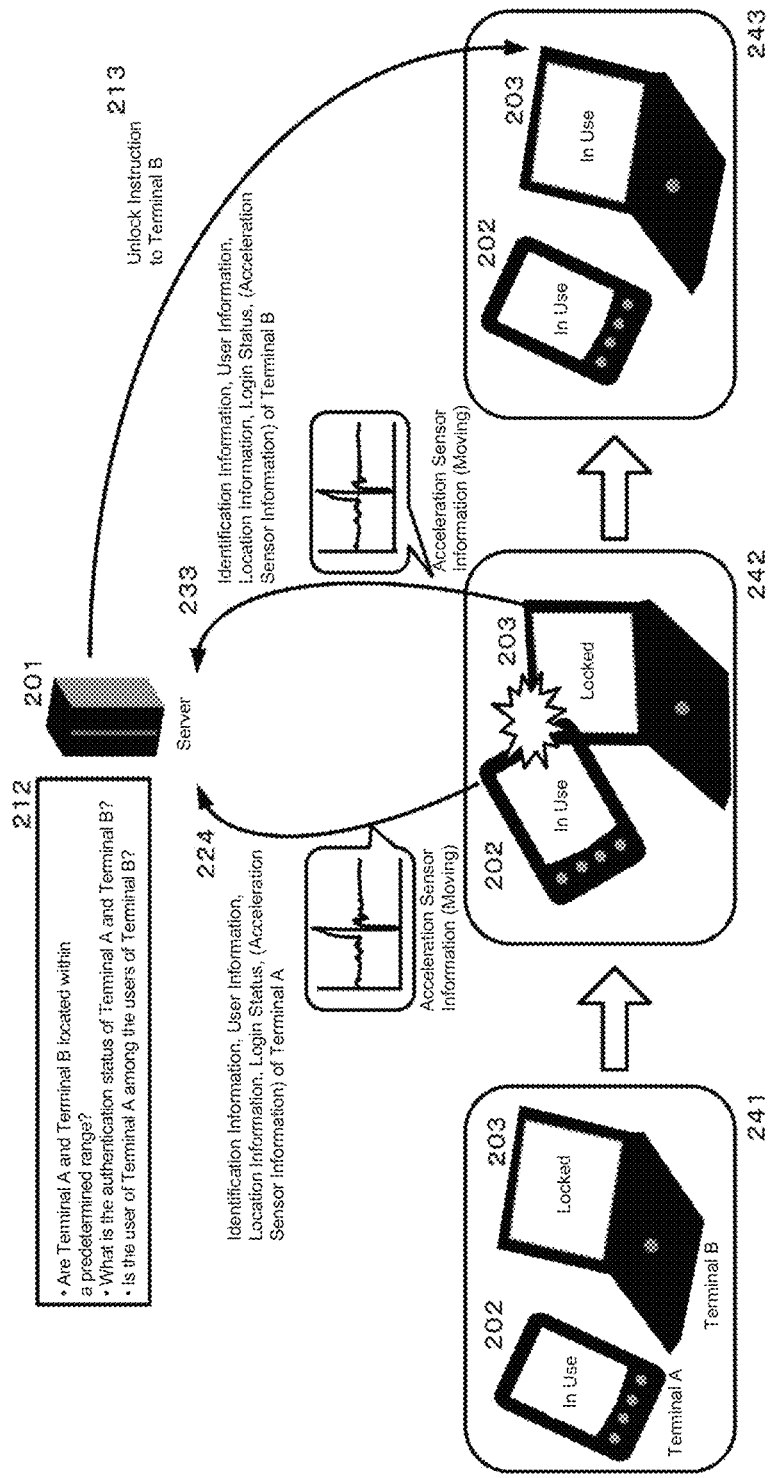
FIG. 2B is an illustration for more easily understanding the flowchart details shown in FIG. 2A.

FIG. 2B is an illustration for more easily understanding the flowchart details shown in FIG. 2A.

State 241 shows that Terminal A (202) is unlocked, and Terminal B (203) is locked (Steps 222 and 231).

State 242 shows Terminal A (202) colliding with Terminal B (203) to provide a predetermined impact to each terminal, and both Terminal A (202) and Terminal B (203) detecting this impact (Steps 223 and 232).

State 243 shows Terminal B (203) unlocked, and authentication propagated from Terminal A (202) to Terminal B (203) (Step 234).

Figure 3A:
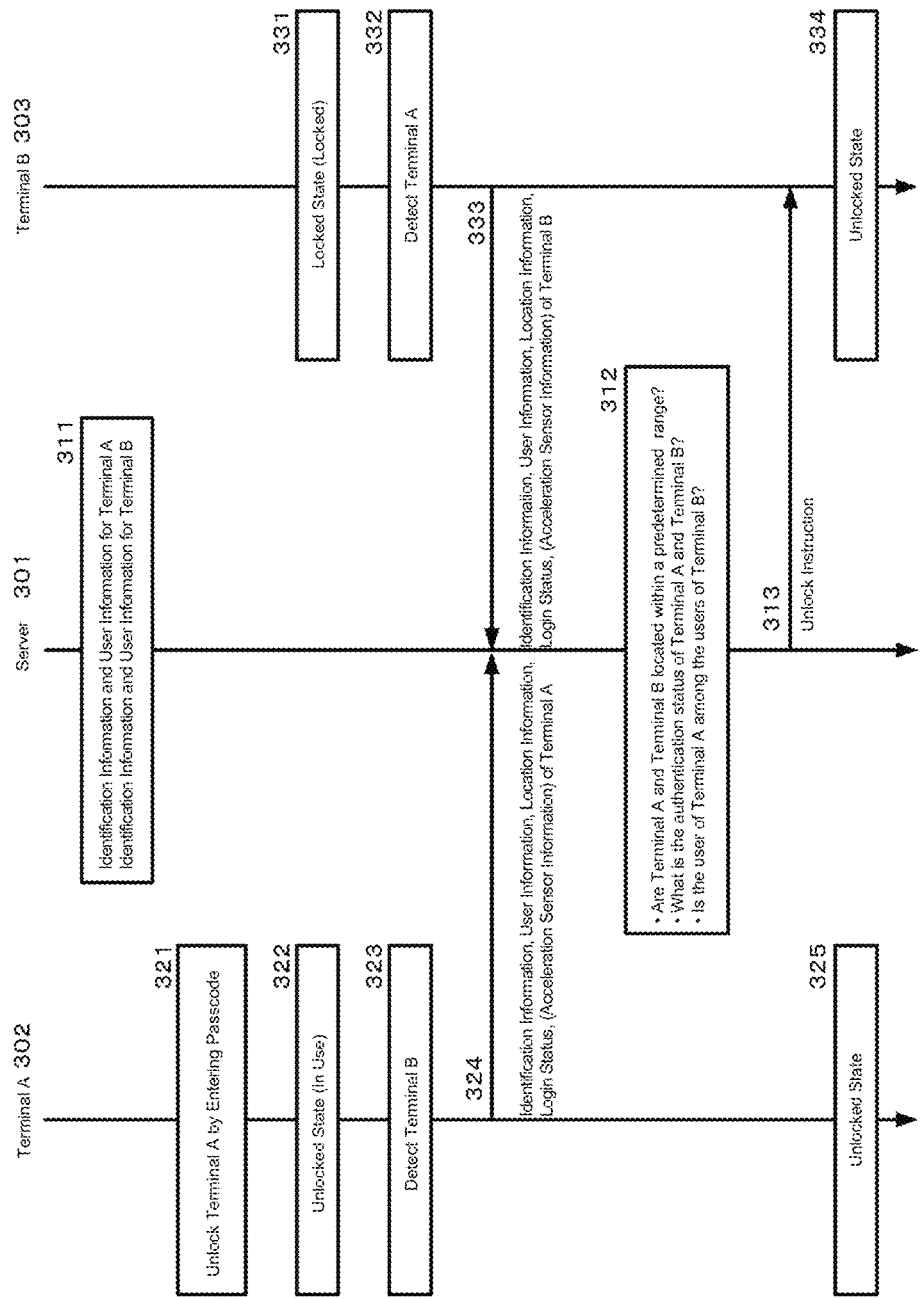
FIG. 3A is a flowchart showing processing according to an embodiment of the present invention which is executed by a server, Terminal A and Terminal B in order to propagate authentication between Terminal A and Terminal B connectable to the server via a network.

FIG. 3A is a flowchart showing processing performed to propagate authentication between Terminal A (302, the terminal propagating the authentication) and Terminal B (303, the terminal to which authentication is being propagated) in response to Terminal A (302) and Terminal B (303) connectable to a server (301) via a network being within a predetermined distance of each other.

The server (301) has a management DB including identification information for Terminal A (302), user information for Terminal A (302), identification information for Terminal B (303), and user information for Terminal B (303) (Step 311).

User A unlocks Terminal A (302) by entering a password directly into Terminal A (302) or by using some other authentication technique (for example, bringing an IC card for authentication into contact or at least close to Terminal B, or biometric authentication) (Step 321).

Terminal A (302) is unlocked by entering a password or using another authentication technique (Step 322). Terminal B (303) remains locked (Step 331).

User A also wishes to use Terminal B (303). User A brings Terminal A (302) within a predetermined distance of Terminal B (303). Bringing within a predetermined distance means bringing Terminal A (302) close enough to detect Terminal B (303) using radio frequency identification (RFID), infrared or ultrasound, or close enough for Terminal A and Terminal B to communicate using a wireless communication device. Detection using RFID may include near field communication (NFC). Detection using infrared may include calling using an infrared receiving application. Detection using ultrasound may include clearance sonar and smart sonic communication (SSC). Wireless communication devices may include Bluetooth (registered trademark), Zig-Bee, ultra wide band (UWB), WiFi, or near field communication. The communication distance using Bluetooth can be limited by radio field strength (Class 1: 100 m; Class 2: 10 m; Class 3: 1 m). In the present embodiment, this may be limited to a short range (for example, Class 3).

In response to Terminal A (302) being brought within a predetermined distance of Terminal B (303) and Terminal A (302) detecting Terminal B (303) (Step 323), Terminal A (302) sends the identification information, user information, location information and login status (authenticated) of Terminal A (302) to the server (301) (Step 324). In response to detecting Terminal B (303) (Step 323), Terminal A (302) may optionally send acceleration sensor information to the server (301) (Step 324).

In response to Terminal A (302) being brought within a predetermined distance of Terminal B (303) and Terminal B (303) detecting Terminal A (303) (Step 332), Terminal B (303) sends the identification information, user information, location information and login status (unauthenticated) of Terminal B (303) to the server (301) (Step 324). In response to detecting Terminal A (302) (Step 332), Terminal B (303) may optionally send acceleration sensor information to the server (301) (Step 333). The transmission of information to the server in Step 324 and the transmission of information to the server in Step 333 do not have to be simultaneous. However, both transmissions have to occur within a predetermined period of time.

The server (301) receives the information from Terminal A (302) and Terminal B (303), and determines the following (Step 312).

The server (301) uses the identification information from Terminal A (302) to determine whether or not Terminal A (302) is a terminal managed by the server. Similarly, the server (301) uses the identification information from Terminal B (303) to determine whether or not Terminal B (303) is a terminal managed by the server. When it has been determined that both Terminal A (302) and Terminal B (303) are managed by the server, the server (301) may perform the following determinations. When it has been determined that Terminal A (302) and/or Terminal B (303) is not managed by the server, the server (301) may not make the following determinations.

The server (301) may identify a pattern for authentication propagation from Terminal A (302) to Terminal B (303) using the login status from Terminal A (302) (authenticated) and the login status from Terminal B (303) (unauthenticated).

The server (301) determines whether or not the user of Terminal A (302, the terminal propagating authentication) is included among the users of Terminal B (303, the terminal to which authentication is to be propagated) using the user information from Terminal A (302), the user information from Terminal B (303), and optionally a propagation pattern. The determination whether the user of Terminal A is included among the users of Terminal B was explained above with reference to FIG. 2A. Further explanation has been omitted here.

The server (301) determines whether Terminal A (302) and Terminal B (303) are within a predetermined range using location information from Terminal A (302) and location information from Terminal B (303).

The server (301) may optionally identify whether Terminal A (302) and Terminal B (303) are moving in tandem using acceleration sensor information from Terminal A (302) and acceleration sensor information from Terminal B (303).

The server (301) optionally sends an instruction to unlock Terminal B (303) in response to determining, on the basis of information from both Terminal A (302) and Terminal B (303), that a user with authorization to use both Terminal A (302) and Terminal B (303) has brought Terminal A (302) within a predetermined distance of Terminal B (303) (Step 313). When the server (301) possesses the password for unlocking Terminal B (303) (preferably, encrypted using the public key of Terminal B (303)), it sends the password to Terminal B (303). When the server (301) does not possess the password for unlocking Terminal B (303), the server (301) may send an unlock command to Terminal B (303).

When Terminal B (303) receives an unlock command from the server (301), Terminal B (303) unlocks itself (Step 334). When Terminal B (303) receives an unlock password from the server (301) and the password is encrypted using the public key of Terminal B (303), the encrypted password may be decrypted using the private key of Terminal B (303). Alternatively, when Terminal B (303) is holding the encrypted password for unlocking Terminal B (303), the encrypted password may be decrypted. Alternatively, Terminal B (303) may receive an unlock command from the server (301), activate a login management module, and automatically perform the unlocking process (see FIG. 11B).

Terminal A (302) remains unlocked (Step 325).

Authorization is propagated from Terminal A (302) to Terminal B (303) in this manner. Thus, user A can unlock Terminal B (303) without entering a password.

Figure 3B:
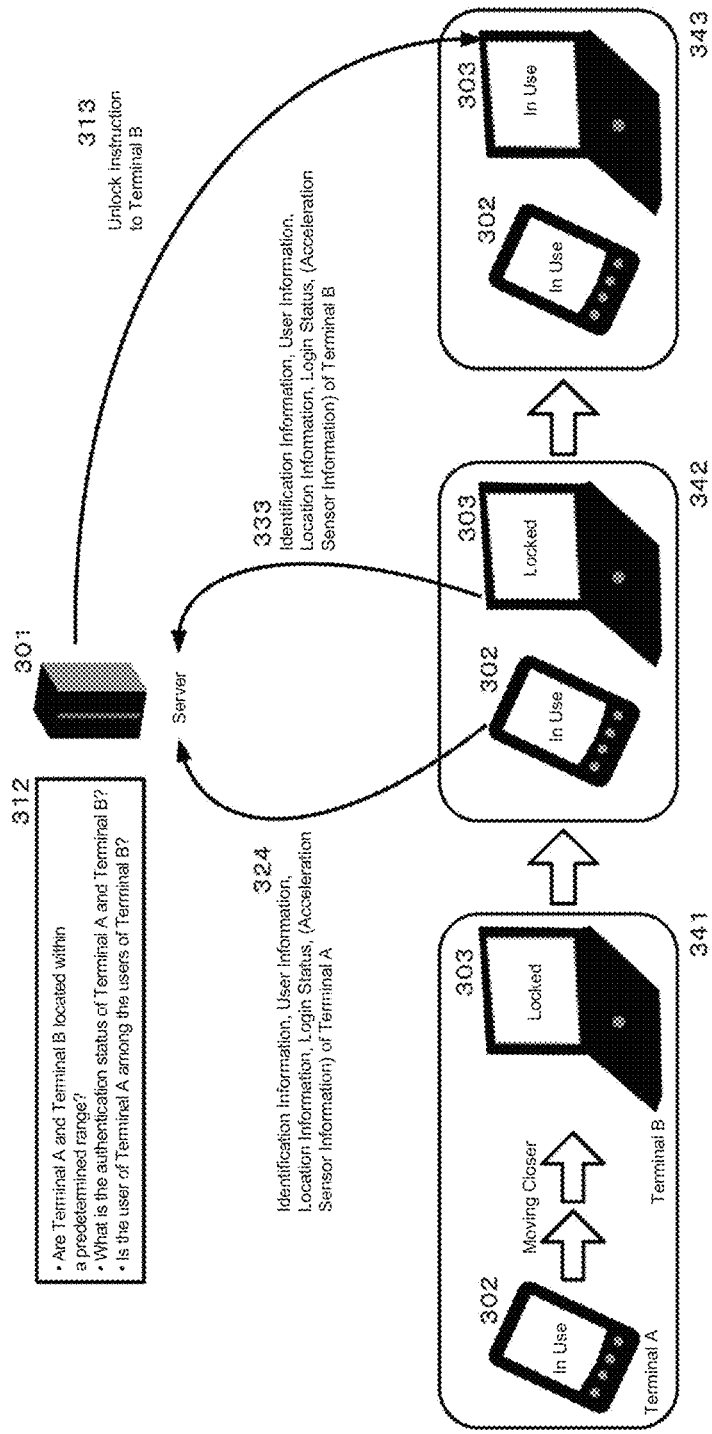
FIG. 3B is an illustration for more easily understating the flowchart details shown in FIG. 3A.

FIG. 3B is an illustration for more easily understanding the flowchart details shown in FIG. 3A.

State 341 shows that Terminal A (302) is unlocked, and Terminal B (303) is locked (Steps 322 and 331). Also, State 341 shows that Terminal A (302) has been brought into close proximity to Terminal B (303).

State 342 shows Terminal A (302) within a predetermined distance of Terminal B (303), and Terminal A (302) and Terminal B (303) detecting each other (Steps 323 and 332).

State 343 shows Terminal B (303) unlocked, and authentication propagated from Terminal A (302) to Terminal B (303). (Step 334).

Figure 4A:
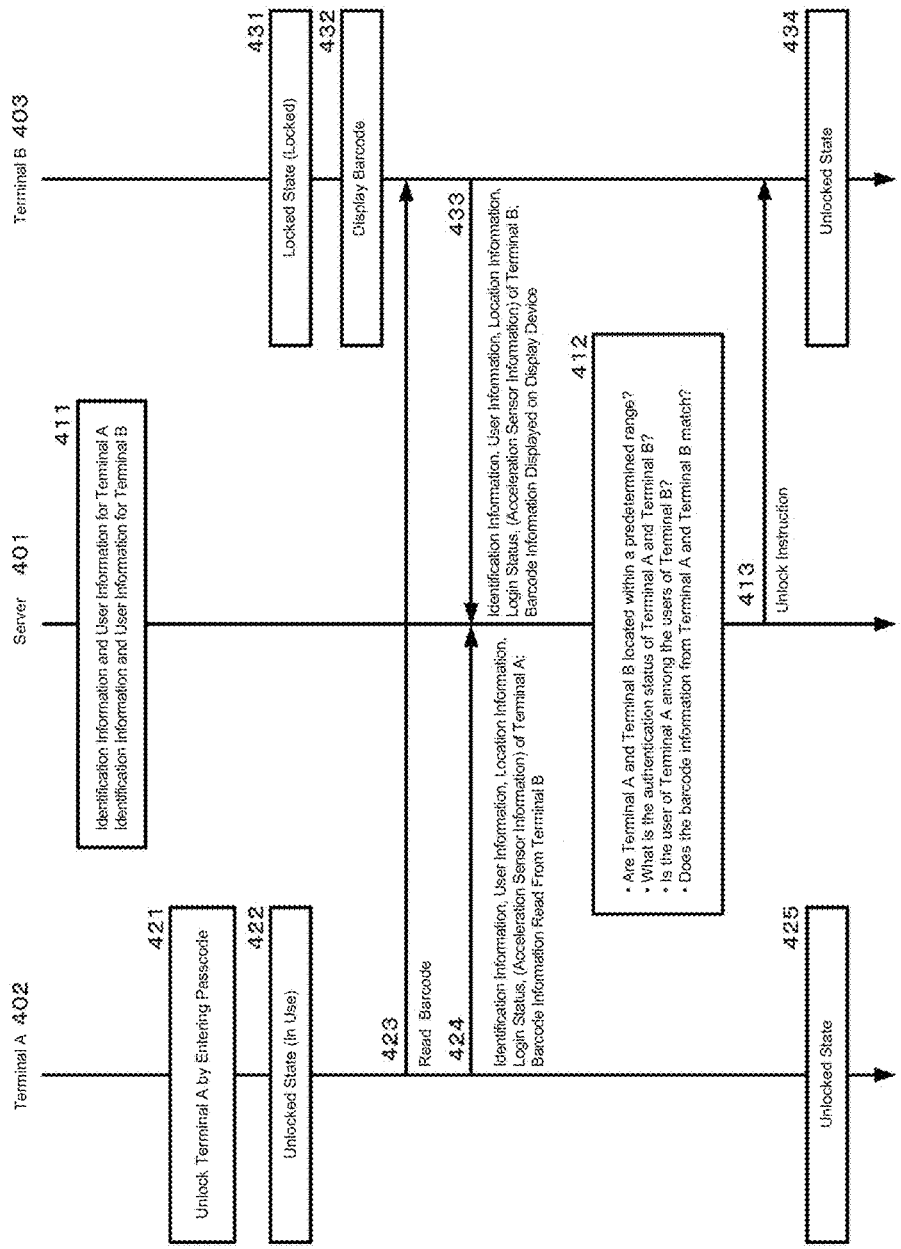
FIG. 4A is a flowchart showing processing according to an embodiment of the present invention which is executed by a server, Terminal A and Terminal B in order to propagate authentication between Terminal A and Terminal B connectable to the server via a network.

FIG. 4A is a flowchart showing processing performed to propagate authentication between Terminal A (402) and Terminal B (403) in response to Terminal A (402) and Terminal B (403) connectable to a server (401) via a network being within a predetermined distance of each other, and Terminal A (402) reading barcode information displayed on the screen of Terminal B (403).

The server (401) has a management DB including identification information for Terminal A (402), user information for Terminal A (402), identification information for Terminal B (403), and user information for Terminal B (403) (Step 411).

User A unlocks Terminal A (402) by entering a password directly into Terminal A (402) (Step 421).

Terminal A (402) is unlocked by entering a password (Step 422). Terminal B (403) remains locked (Step 431).

User A also wishes to use Terminal B (403). User A brings Terminal A (402) within a predetermined distance of Terminal B (403). User A operates Terminal B (403) so that a barcode is displayed on the screen of Terminal B (403). In response, Terminal B (403) displays a barcode on the screen of Terminal B (403) (Step 432). Alternatively, Terminal B (403) detects Terminal A (402), and automatically displays a barcode on the screen of Terminal B (403) (Step 432). The barcode may be a one-dimensional barcode or a two-dimensional barcode (for example, a QR Code (registered trademark) or a MicroQR Code (registered trademark)). The display of a different barcode each time one is displayed (one-time passcode) is preferred from the standpoint of security. When brought within a predetermined distance of each other, Terminal A (402) is able to read the barcode information on the screen of Terminal B (403).

When Terminal A (402) has been brought within a predetermined distance of Terminal B (403), and the camera in Terminal A (402) has read the barcode information displayed on the screen of Terminal B (403) (Step 423), Terminal A (402) responds by sending the identification information, user information, location information and login status (authenticated) of Terminal A (402) and the barcode information read from Terminal B (403) to the server (401) (Step 424). Terminal A (402) may optionally send acceleration sensor information to the server (401) (Step 424).

Terminal B (403) displays a barcode on its screen then, after a predetermined amount of time has passed, sends the identification information, user information, location information and login status (unauthenticated) of Terminal B (403) and the barcode information displayed on its screen to the server (401) (Step 433). Terminal B (403) may optionally send acceleration sensor information to the server (401) (Step 433).

In the present embodiment, a barcode is displayed on the screen of Terminal B (403), and Terminal A (402) reads the barcode information. In another embodiment, a barcode may be displayed on the screen of Terminal A (402), and Terminal B (403) may read the barcode information. In another embodiment, a barcode is displayed on the screen of Terminal B (403) and Terminal A (402) reads the barcode information, and a barcode is displayed on the screen of Terminal A (402) and Terminal B (403) reads the barcode information.

The server (401) receives the information from Terminal A (402) and Terminal B (403), and determines the following (Step 412).

The server (401) uses the identification information from Terminal A (402) to determine whether or not Terminal A (402) is a terminal managed by the server. Similarly, the server (401) uses the identification information from Terminal B (403) to determine whether or not Terminal B (403) is a terminal managed by the server. When it has been determined that both Terminal A (402) and Terminal B (403) are managed by the server, the server (401) may perform the following determinations. When it has been determined that Terminal A (402) and/or Terminal B (403) is not managed by the server, the server (401) may not make the following determinations.

The server (401) may identify a pattern for authentication propagation from Terminal A (402) to Terminal B (403) using the login status from Terminal A (402) (authenticated) and the login status from Terminal B (403) (unauthenticated).

The server (401) determines whether or not the user of Terminal A (402, the terminal propagating authentication) is included among the users of Terminal B (403, the terminal to which authentication is to be propagated) using the user information from Terminal A (402), the user information from Terminal B (403), and optionally a propagation pattern. The determination whether the user of Terminal A is included among the users of Terminal B was explained above with reference to FIG. 2A. Further explanation has been omitted here.

The server (401) determines whether Terminal A (402) and Terminal B (403) are within a predetermined range using location information from Terminal A (402) and location information from Terminal B (403).

The server (401) may optionally identify whether Terminal A (402) and Terminal B (403) are moving in tandem using acceleration sensor information from Terminal A (402) and acceleration sensor information from Terminal B (403).

The server (401) optionally sends an instruction to unlock Terminal B (403) in response to determining, on the basis of information from both Terminal A (402) and Terminal B (403), that a user with authorization to use both Terminal A (402) and Terminal B (403) has brought Terminal A (402) within a predetermined distance of Terminal B (403) (Step 413). When the server (401) possesses the password for unlocking Terminal B (403) (preferably, encrypted using the public key of Terminal B (403)), it sends the password to Terminal B (403). When the server (401) does not possess the password for unlocking Terminal B (403), the server (401) may send an unlock command to Terminal B (403).

When Terminal B (403) receives an unlock command from the server (401), Terminal B (403) unlocks itself (Step 434). When Terminal B (403) receives an unlock password from the server (401) and the password is encrypted using the public key of Terminal B (403), the encrypted password may be decrypted using the private key of Terminal B (403). Alternatively, when Terminal B (403) is holding the encrypted password for unlocking Terminal B (403), the encrypted password may be decrypted. Alternatively, Terminal B (403) may receive an unlock command from the server (401), activate a login management module, and automatically perform the unlocking process (see FIG. 11B).

Terminal A (402) remains unlocked (Step 425).

Authorization is propagated from Terminal A (402) to Terminal B (403) in this manner. Thus, user A can unlock Terminal B (403) without entering a password.

Figure 4B:
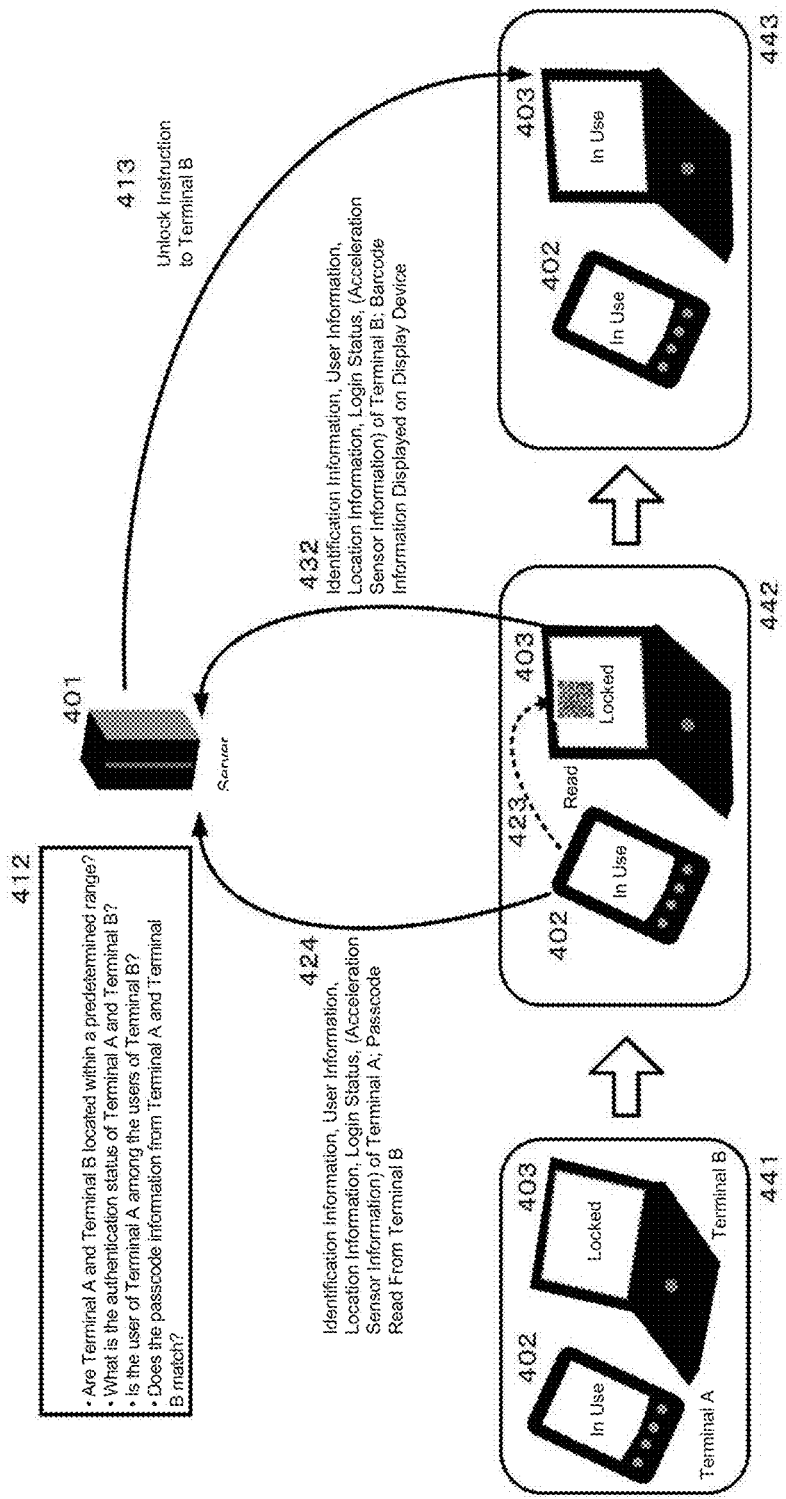
FIG. 4B is an illustration for more easily understanding the flowchart details shown in FIG. 4A.

FIG. 4B is an illustration for more easily understanding the flowchart details shown in FIG. 4A.

State 441 shows that Terminal A (402) is unlocked, and Terminal B (403) is locked (Steps 422 and 431). Also, State 441 shows that Terminal A (402) has been brought into close proximity to Terminal B (403).

State 442 shows that Terminal A (402) is within a predetermined distance of Terminal B (403) (Step 432), and that the camera in Terminal A (402) is reading the barcode information displayed on the screen of Terminal B (403) (Step 423).

State 443 shows Terminal B (403) unlocked, and authentication propagated from Terminal A (402) to Terminal B (403). (Step 434).

FIG. 5A, FIG. 5B and FIG. 5C, FIG. 6A and FIG. 6B, and FIG. 7A and FIG. 7B are flowcharts and illustrations of flowchart details showing the security processing according to an embodiment of the present invention which is performed after the authentication propagation shown in FIG. 2A, FIG. 3A and FIG. 4A.

Server (501), server (601) and server (701) are each the same as server (201), server (301) and server (401). Terminal A (502), Terminal A (602) and Terminal A (702) are each the same as Terminal A (202), Terminal A (302) and Terminal A (402). Terminal B (503), Terminal B (603) and Terminal B (703) are each the same as Terminal B (203), Terminal B (303) and Terminal B (403).

Figure 5A:
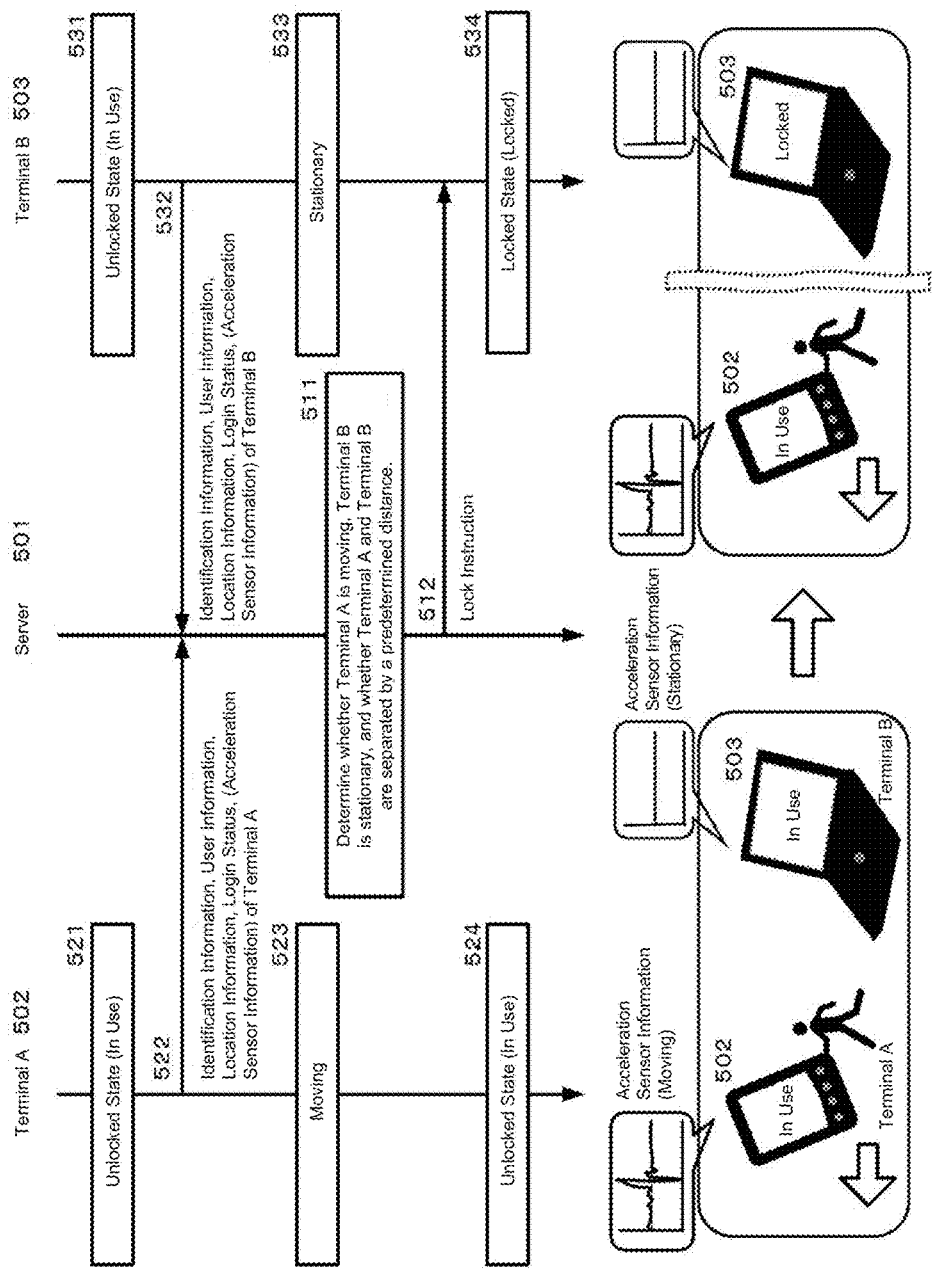
FIG. 5A is a flowchart of the processing for locking Terminal B and an illustration of flowchart details according to an embodiment of the present invention for a situation in which Terminal A (unlocked) is moving and Terminal B (unlocked) is stationary.

FIG. 5A is a flowchart and an illustration of flowchart details showing the process used to lock Terminal B (unlocked) according to an embodiment of the present invention from the standpoint of security when Terminal A (502) (unlocked) is moving and Terminal B (503) (unlocked) is stationary.

Terminal A (502) and Terminal B (503) are both unlocked (Steps 521 and 531). Periodically or in response to a certain event occurring in Terminal A (502), Terminal A (502) may send identification information, user information, location information and the login status of Terminal A (502) and optionally acceleration sensor information to the server (501) (Step 522). Periodically or in response to a certain event occurring in Terminal B (503), Terminal B (503) may also similarly send identification information, user information, location information and the login status of Terminal B (503) and optionally acceleration sensor information to the server (501) (Step 532).

Terminal A (502) is moving because Terminal A (502) has been picked up and carried off by User A (Step 523). In response to Terminal A (502) beginning to move, Terminal A (502) may send identification information, user information, location information and the login status of Terminal A (502) and optionally acceleration sensor information to the server (501) (not shown).

Terminal B (503) remains stationary (Step 533).

In response to Terminal A (502) moving but Terminal B (503) remaining stationary, the server (501) determines whether or not Terminal A (502) has moved a predetermined distance from Terminal B (503) using the location information from Terminal A (502) and Terminal B (503) (Step 511).

In response to Terminal A (502) and Terminal B (503) being a predetermined distance from each other, server (501) sends a lock instruction to stationary Terminal B (503) (Step 512). The server (501) may send a lock command to Terminal B (503) as a lock instruction. When Terminal B (503) requires a password to lock Terminal B (503), the server (501) may send the password to Terminal B (503) in addition to a lock command. From the standpoint of security, the password is preferably encrypted using, for example, the public key of Terminal B (503).

In response to Terminal B (503) receiving a lock instruction from server (501), Terminal B (503) locks itself (Step 534). When Terminal B (503) requires a password to lock Terminal B (503), Terminal B (503) may decrypt the password encrypted with the public key of Terminal B (503) and received from server (501) using the private key of Terminal B (503). Alternatively, Terminal B (503) may receive a lock instruction from the server (501), activate the login management module, and automatically lock itself (see FIG. 11B).

Terminal A (502) remains unlocked (Step 524).

In the situation shown in FIG. 5A, Terminal B (503) is unlocked, and the server (501) automatically locks Terminal B (503) from the standpoint of security, because User A has carried off Terminal A (503) (moved a predetermined distance from Terminal B (503)).

Figure 5B:
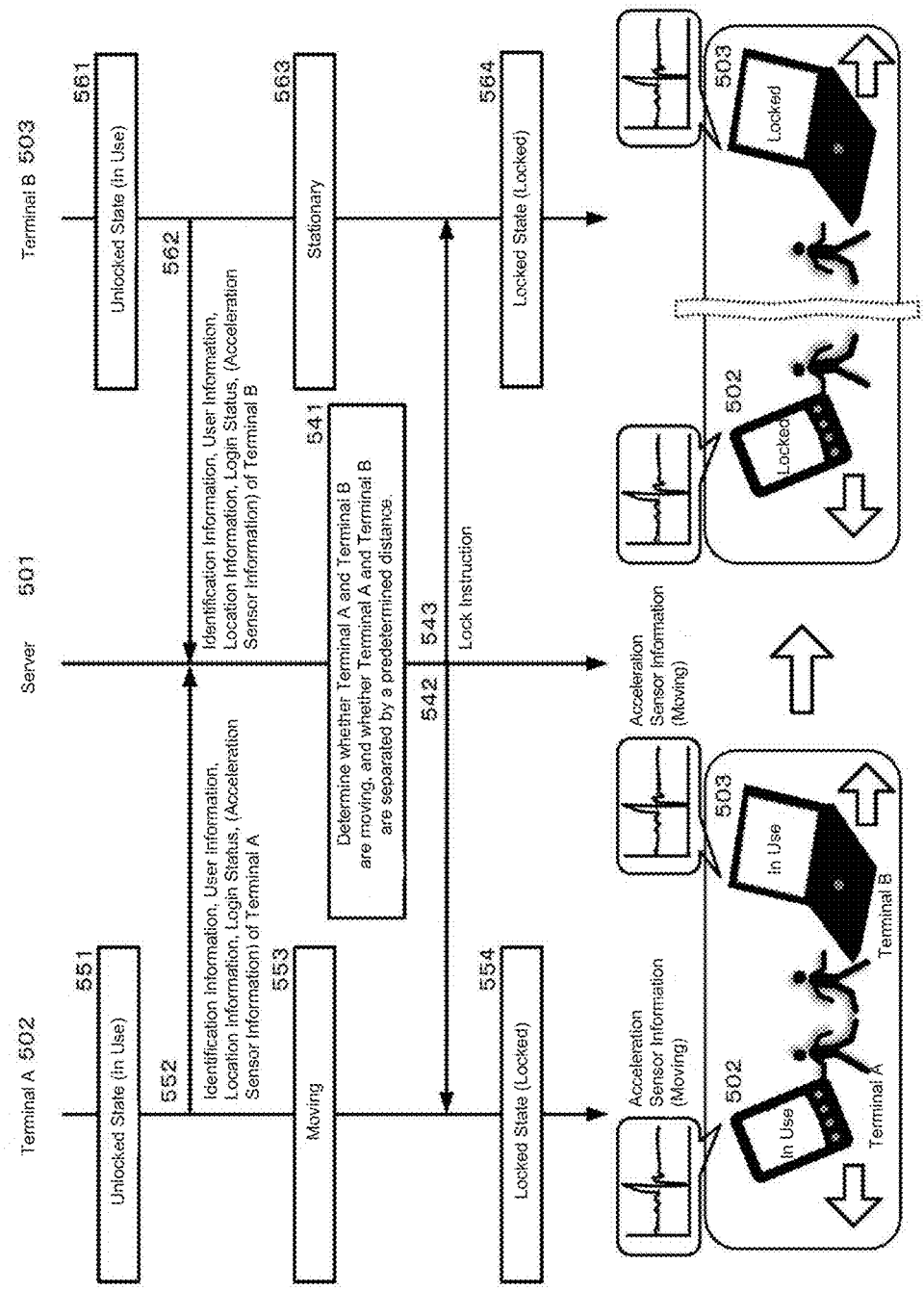
FIG. 5B is a flowchart of the processing for locking Terminal A and Terminal B and an illustration of flowchart details according to an embodiment of the present invention for a situation in which Terminal A (unlocked) and/or Terminal B (unlocked) is moving and the terminals are becoming farther apart.

FIG. 5B is a flowchart and an illustration of flowchart details showing the process used to lock both Terminal A (502) and Terminal B (503) according to an embodiment of the present invention from the standpoint of security when both Terminal A (502) (unlocked) and Terminal B (503) (unlocked) are moving and the terminals are a predetermined distance from each other.

Terminal A (502) and Terminal B (503) are both unlocked (Steps 551 and 561). Periodically or in response to a certain event occurring in Terminal A (502), Terminal A (502) may send identification information, user information, location information and the login status of Terminal A (502) and optionally acceleration sensor information to the server (501) (Step 552). Periodically or in response to a certain event occurring in Terminal B (503), Terminal B (503) may also similarly send identification information, user information, location information and the login status of Terminal B (503) and optionally acceleration sensor information to the server (501) (Step 562).

Terminal A (502) is moving because Terminal A (502) has been picked up and carried off by someone (Step 553). In response to Terminal A (502) beginning to move, Terminal A (502) may send identification information, user information, location information and the login status of Terminal A (502) and optionally acceleration sensor information to the server (501) (not shown).

Terminal B (503) is moving because Terminal B (503) has been picked up and carried off by someone (Step 563). In response to Terminal B (503) beginning to move, Terminal B (503) may send identification information, user information, location information and the login status of Terminal B (503) and optionally acceleration sensor information to the server (501) (not shown).

In response to both Terminal A (502) and Terminal B (503) moving, the server (501) determines whether or not Terminal A (502) and Terminal B (503) have moved a predetermined distance from each other using the location information from Terminal A (502) and Terminal B (503) (Step 541).

In response to both Terminal A (502) and Terminal B (503) moving a predetermined distance away from each other, the server (501) sends a lock instruction to both moving Terminal A (502) and moving Terminal B (503) (Steps 542 and 543). The server (501) may send a lock command to Terminal A (502) as a lock instruction. When Terminal A (502) requires a password to lock Terminal A (502), the server (501) may send the password to Terminal A (502) in addition to a lock command. From the standpoint of security, the password is preferably encrypted using, for example, the public key of Terminal A (502). Similarly, when Terminal B (503) requires a password to lock Terminal B (503), the server (501) may send the password to Terminal B (503) in addition to a lock command. From the standpoint of security, the password is preferably encrypted using, for example, the public key of Terminal B (503).

In response to Terminal A (502) receiving a lock instruction from the server (501), Terminal A (502) locks itself (Step 554). When Terminal A (502) requires a password to lock Terminal A (502), Terminal A (502) may decrypt the password encrypted with the public key of Terminal A (502) and received from server (501) using the private key of Terminal A (502). Alternatively, Terminal A (502) may receive a lock instruction from the server (501), activate the login management module, and automatically lock itself (see FIG. 11B). Similarly, Terminal B (503) may perform the same locking operation as Terminal A (502) so that Terminal B (503) locks itself (Step 564).

In the situation shown in FIG. 5B, both Terminal A (502) and Terminal B (503) are unlocked, and both Terminal A (502) and Terminal B (503) have moved away from each other by a predetermined distance. Here, it is assumed that Terminal A (502) and Terminal B (503) are being carried away by different people. Therefore, from the standpoint of security, the server (501) automatically locks both Terminal A (502) and Terminal B (503).

Figure 5C:
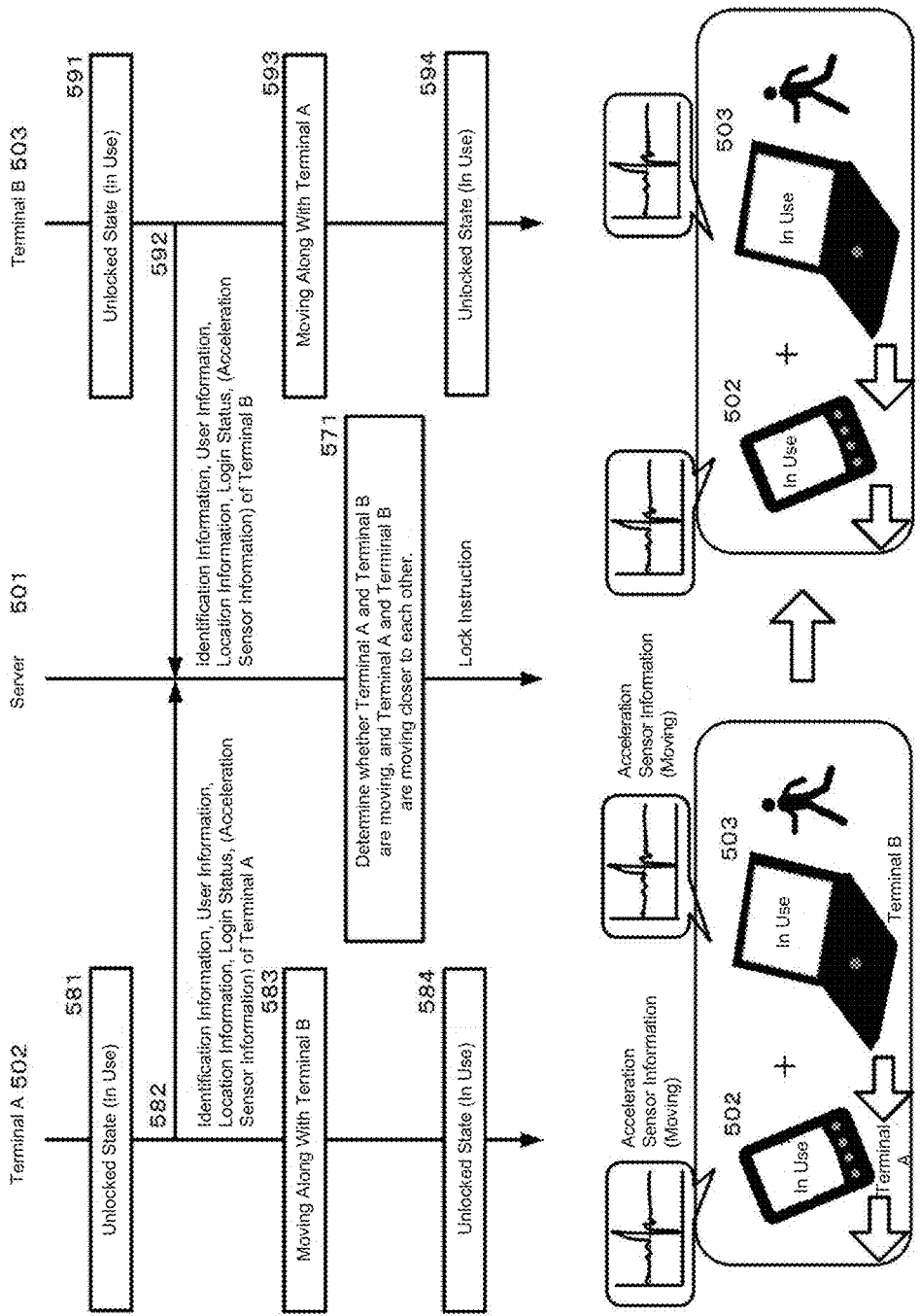
FIG. 5C is a flowchart of the processing for keeping Terminal A and Terminal B unlocked and an illustration of flowchart details according to an embodiment of the present invention for a situation in which Terminal A (unlocked) and/or Terminal B (unlocked) is moving and the terminals becoming closer to each other.

FIG. 5C is a flowchart and an illustration of flowchart details showing the process used to keep in an unlocked state both Terminal A (502) (unlocked) and Terminal B (503) (unlocked) according to an embodiment of the present invention which keeps both Terminal A (502) and Terminal B (503) unlocked when the terminals move close to each other.

Terminal A (502) and Terminal B (503) are both unlocked (Steps 581 and 591). Periodically or in response to a certain event occurring in Terminal A (502), Terminal A (502) may send identification information, user information, location information and the login status of Terminal A (502) and optionally acceleration sensor information to the server (501) (Step 582). Periodically or in response to a certain event occurring in Terminal B (503), Terminal B (503) may also similarly send identification information, user information, location information and the login status of Terminal B (503) and optionally acceleration sensor information to the server (501) (Step 592).

Terminal A (502) is moving because Terminal A (502) has been picked up and carried off by User A (Step 583). In response to Terminal A (502) beginning to move, Terminal A (502) may send identification information, user information, location information and the login status of Terminal A (502) and optionally acceleration sensor information to the server (501) (not shown).

Terminal B (503) is also moving because Terminal B (503) has been picked up and carried off by User A (Step 593). In response to Terminal B (503) beginning to move, Terminal B (503) may send identification information, user information, location information and the login status of Terminal B (503) and optionally acceleration sensor information to the server (501) (not shown).

In response to both Terminal A (502) and Terminal B (503) moving, the server (501) determines whether or not Terminal A (502) and Terminal B (503) have moved a predetermined distance from each other using the location information from Terminal A (502) and Terminal B (503) (Step 571).

In response to Terminal A (502) and Terminal B (503) moving closer to each other, the server (501) performs nothing on moving Terminal A (502) and Terminal B (503). Therefore, both Terminal A (502) and Terminal B (503) remain unlocked (Steps 584 and 594).

In the situation shown in FIG. 5C, both Terminal A (502) and Terminal B (503) are unlocked, User A carries Terminal A (502) and Terminal B (503), and both Terminal A (502) and Terminal B (503) move closer to each other. As a result, there are no problems from the standpoint of security. Therefore, the server (501) performs nothing on moving Terminal A (502) and Terminal B (503).

Figure 6A:
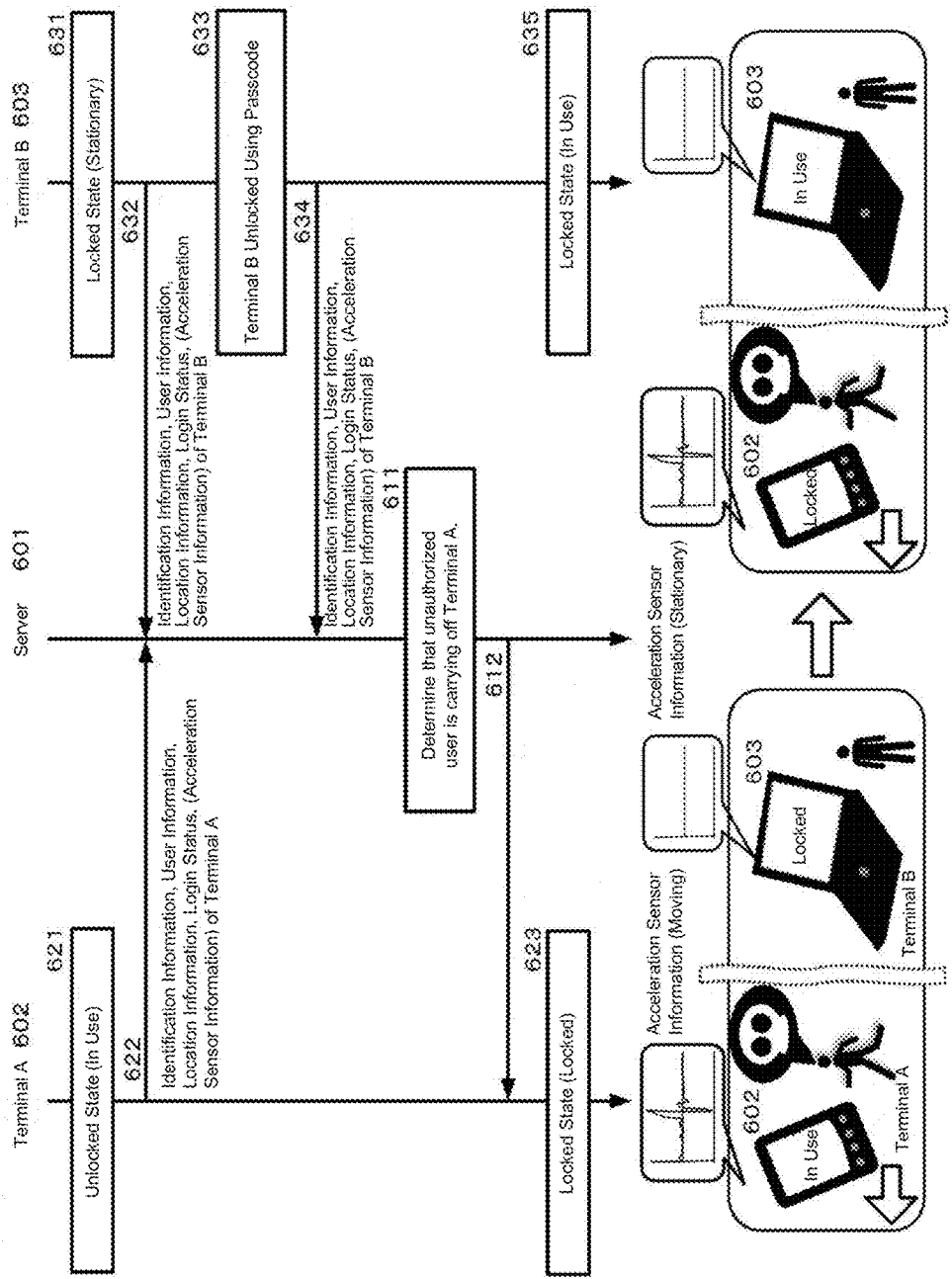
FIG. 6A is a flowchart of the processing for locking Terminal A and an illustration of flowchart details according to an embodiment of the present invention for a situation in which Terminal A (unlocked) is moving, Terminal B (locked) is stationary, and the user has unlocked Terminal B by entering a passcode.

FIG. 6A is a flowchart and an illustration of flowchart details showing the process used to lock Terminal A (602) according to an embodiment of the present invention when Terminal A (602) (unlocked) is moving, Terminal B (603) (locked) is stationary, and a user enters a password to unlock Terminal B (603).

Terminal A (602) is unlocked (Step 621), and Terminal B (603) is locked (Step 631). Periodically or in response to a certain event occurring in Terminal A (602), Terminal A (602) may send identification information, user information, location information and the login status of Terminal A (602) and optionally acceleration sensor information to the server (601) (Step 622). Periodically or in response to a certain event occurring in Terminal B (603), Terminal B (603) may also similarly send identification information, user information, location information and the login status of Terminal B (603) and optionally acceleration sensor information to the server (601) (Step 632).

User A unlocks Terminal B (603) by entering a password directly into Terminal B (603) or by using some other authentication technique (for example, bringing an IC card for authentication into contact or at least close to Terminal B, or biometric authentication) (Step 633). In response to an event such as being unlocked, Terminal B (603) may send identification information, user information, location information and the login status of Terminal B (602) and optionally acceleration sensor information to the server (601) (Step 635). In response to being unlocked, Terminal B (603) also enters the unlocked state (Step 635).

In response to Terminal A (602) moving in an unlocked state and Terminal B (603) being unlocked by User A by entering a password, the server (601) determines that Terminal A (602) is being carried away not by User A but by an unauthorized user (Step 611).

In response to the determination made in Step 611, the server (601) may send a lock instruction to Terminal A (602) in Step 612. The server (601) may send a lock command to Terminal A (602) as a lock instruction. When Terminal A (602) requires a password to lock Terminal A (602), the server (601) may send the password to Terminal A (602) in addition to a lock command. From the standpoint of security, the password is preferably encrypted using, for example, the public key of Terminal A (602).

Alternatively, in response to the determination made in Step 611, the server (601) may send an internal data delete command or initialization command to Terminal A (602) instead of a lock instruction (Step 612).

When Terminal A (602) receives an unlock command from the server (601), Terminal A (602) unlocks itself (Step 623). When Terminal A (602) receives an unlock password from the server (601) and the password is encrypted using the public key of Terminal A (602), the encrypted password may be decrypted using the private key of Terminal A (602). Alternatively, when Terminal A (602) is holding the encrypted password for unlocking Terminal A (602), the encrypted password may be decrypted. Alternatively, Terminal A (602) may receive an unlock command from the server (601), activate a login management module, and automatically perform the unlocking process (see FIG. 11B).

When a lock command is received from the server (601), Terminal A (602) may also disable the unlocking function itself so that Terminal A (602) cannot be unlocked even if the password is entered directly into the terminal.

Alternatively, when a lock command is received from the server (601), Terminal A (602) may delete internal data or perform initialization instead of the locking process.

Terminal B (603) remains unlocked (Step 524).

The server (601) may optionally send a display message instruction to Terminal B (603) to display on the screen of Terminal B (603) that Terminal A (602) is moving and has been automatically locked (not shown).

In the situation shown in FIG. 6A, Terminal B (603) (stationary) was unlocked by entering a password. Because Terminal A (602) was moving during this process, there is a high probability that Terminal A (602) is being carried off by an unauthorized user. Therefore, the server (601) automatically locks moving Terminal A (602) as a security precaution.

Figure 6B:
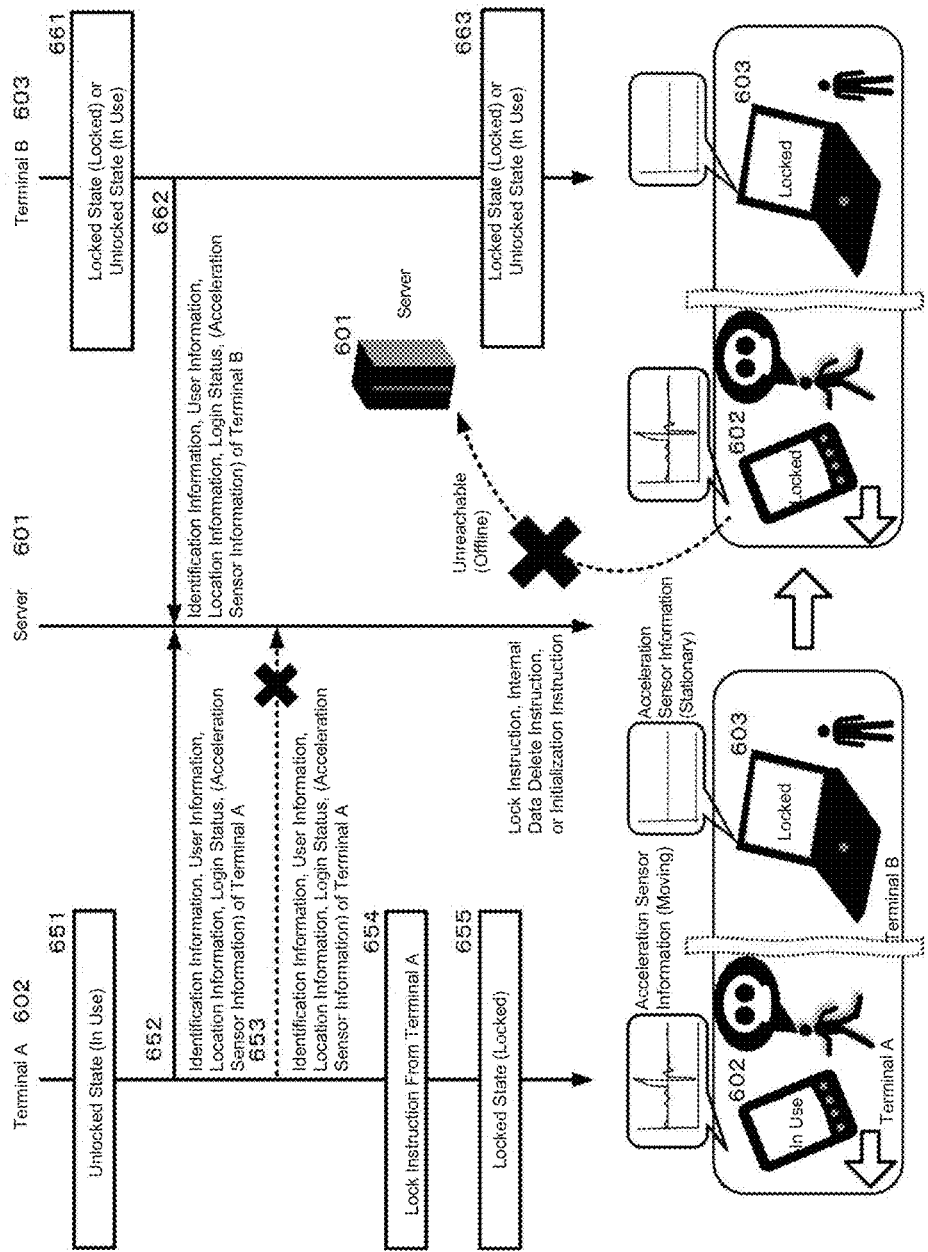
FIG. 6B is a flowchart of the processing performed by Terminal A so that Terminal A can lock itself and an illustration of flowchart details according to an embodiment of the present invention for a situation in which Terminal A (moving or stationary) is unlocked (in use), and acceleration sensor information, location information and the login status cannot be sent from Terminal A to the server.

FIG. 6B is a flowchart and an illustration of flowchart details showing the process used by Terminal A (602) to lock Terminal A (602) itself according to an embodiment of the present invention when Terminal A (602) (moving or stationary) is unlocked (in use), and information cannot be sent from Terminal A (602) to the server (601).

Terminal A (602) is unlocked (Step 651), and Terminal B (603) is either locked or unlocked (Step 661). In the embodiment shown in FIG. 6B, the login status of Terminal B (603) is not at issue. Periodically or in response to a certain event occurring in Terminal A (602), Terminal A (602) may send identification information, user information, location information and the login status of Terminal A (602) and optionally acceleration sensor information to the server (601) (Step 652). Periodically or in response to a certain event occurring in Terminal B (603), Terminal B (603) may also similarly send identification information, user information, location information and the login status of Terminal B (603) and optionally acceleration sensor information to the server (601) (Step 662).

In response to sending information to the server (601), Terminal A (602) receives an acknowledgement signal from the server. Terminal A (602) receives an acknowledgement signal from the server (601) in response to sending information in Step 652 (not shown). However, Terminal A (602) does not receive an acknowledgement signal from the server (601) in response to sending information in Step 653 (not shown).

In response to not receiving an acknowledgement signal from the server (601) for sending information in Step 653, Terminal A (602) may output a lock instruction to lock Terminal A (602) itself (Step 654). Alternatively, Terminal A (602) may send the information to the server (601) again or may send a command (such as a ping command) to determine whether communication with the server (601) is possible. In response to not receiving an acknowledge signal from the server (601) for this transmission, Terminal A (602) may output a lock instruction for Terminal A (602) to lock itself.

In response to the lock instruction, Terminal A (602) enters a locked state (Step 655).

In the situation shown in FIG. 6B, Terminal A (602) automatically locked Terminal A (602) itself as a security precaution because Terminal A (602) could not communicate with the server (601). It performed this operation regardless of the login status of Terminal B (603) or whether it was moving or stationary. It also performs this operation regardless of the source of the problem, whether it is a problem with Terminal A (602) itself, a problem with the network, or a problem with the server (106).

Figure 7A:
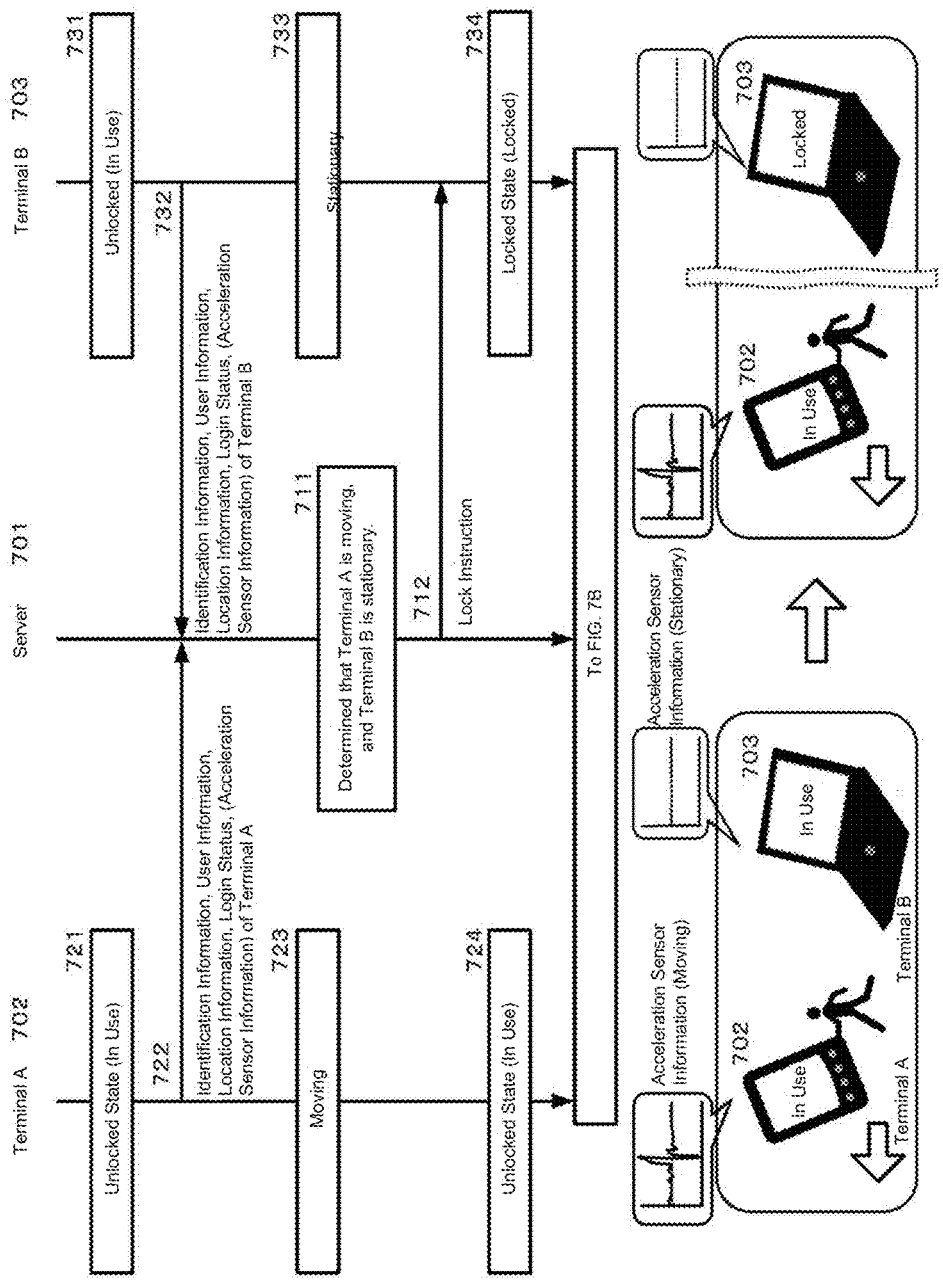
FIG. 7A is a flowchart of the processing for locking Terminal B and an illustration of flowchart details according to an embodiment of the present invention for a situation in which Terminal A (unlocked) is moving and Terminal B (unlocked) is stationary.
Figure 7B:
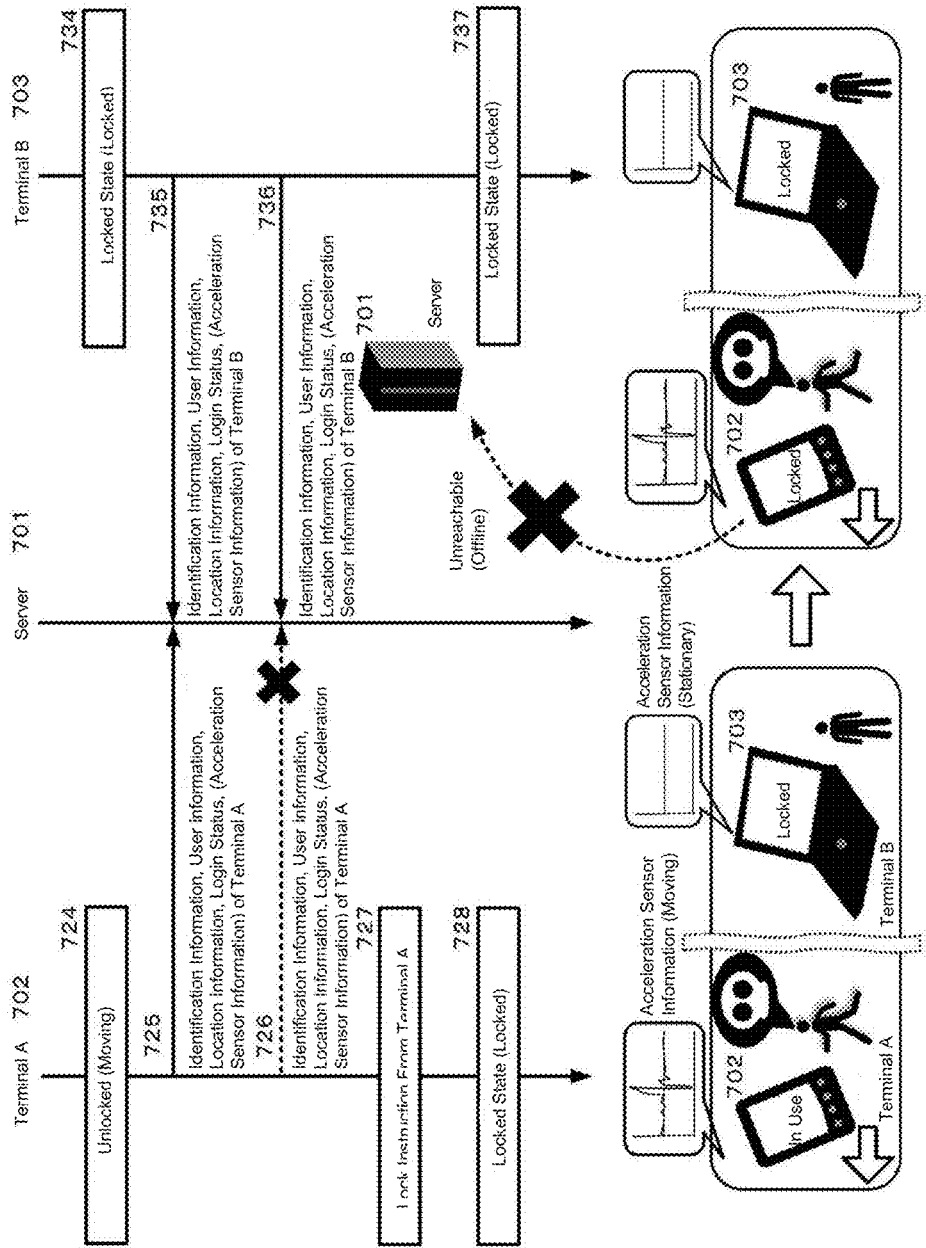
FIG. 7B is a flowchart of the processing performed by Terminal A so that Terminal A can lock itself and an illustration of flowchart details according to an embodiment of the present invention for a situation in which Terminal A (unlocked) is moving, Terminal B (locked) is stationary, and acceleration sensor information, location information and the login status cannot be sent from Terminal A to the server.

FIG. 7A and FIG. 7B show flowcharts and illustrations of flowchart details for the series of operations in accordance with an embodiment of the present invention which are performed for Terminal A (702) to lock itself when Terminal A (702) (unlocked) is moving, Terminal B (703) (unlocked) is stationary, Terminal B (703) is locked, and Terminal A (702) cannot send information to the server (701).

Both Terminal A (702) and Terminal B (703) are unlocked (Steps 721 and 731). Periodically or in response to a certain event occurring in Terminal A (702), Terminal A (702) may send identification information, user information, location information and the login status of Terminal A (702) and optionally acceleration sensor information to the server (701) (Step 722, Step 725, and Step 726). Periodically or in response to a certain event occurring in Terminal B (703), Terminal B (703) may also similarly send identification information, user information, location information and the login status of Terminal B (703) and optionally acceleration sensor information to the server (701) (Step 732, Step 735, and Step 736).

Terminal A (702) is moving because Terminal A (702) has been picked up and carried off by User A (Step 723). In response to Terminal A (702) beginning to move, Terminal A (702) may send identification information, user information, location information and the login status of Terminal A (702) and optionally acceleration sensor information to the server (701) (not shown).

Terminal B (703) remains stationary (Step 733).

In response to Terminal A (702) moving but Terminal B (703) remaining stationary, the server (701) determines whether or not Terminal A (702) has moved a predetermined distance from Terminal B (703) using the location information from Terminal A (702) and Terminal B (703) (Step 711).

In response to Terminal A (702) and Terminal B (703) being a predetermined distance from each other, server (701) sends a lock instruction to stationary Terminal B (703) (Step 712). The server (701) may send a lock command to Terminal B (703) as a lock instruction. When Terminal B (703) requires a password to lock Terminal B (703), the server (701) may send the password to Terminal B (703) in addition to a lock command. From the standpoint of security, the password is preferably encrypted using, for example, the public key of Terminal B (703).

In response to Terminal B (703) receiving a lock instruction from server (701), Terminal B (703) locks itself (Step 734). When Terminal B (703) requires a password to lock Terminal B (703), Terminal B (703) may decrypt the password encrypted with the public key of Terminal B (703) and received from server (701) using the private key of Terminal B (703). Alternatively, Terminal B (703) may receive a lock instruction from the server (701), activate the login management module, and automatically lock itself (see FIG. 11B).

In response to sending information to the server (701), Terminal A (702) receives an acknowledgement signal from the server. Terminal A (702) receives an acknowledgement signal from the server (701) in response to sending information in Step 725 (not shown). However, Terminal A (702) does not receive an acknowledgement signal from the server (701) in response to sending information in Step 726 (not shown).

In response to not receiving an acknowledgement signal from the server (701) for sending information in Step 726, Terminal A (702) may output a lock instruction to lock Terminal A (702) itself (Step 727). Alternatively, Terminal A (702) may send the information to the server (701) again or may send a command (such as a ping command) to determine whether communication with the server (701) is possible. In response to not receiving an acknowledge signal from the server (701) for this transmission, Terminal A (702) may output a lock instruction for Terminal A (702) to lock itself.

In response to this lock instruction, Terminal A (702) enters a locked state (Step 728). Terminal B (703) remains in the locked state (Step 737).

FIG. 7A and FIG. 7B show how a terminal is able to automatically lock itself in response to the state of the terminal (moving or stationary, logged in, communicating with the server, etc.) according to an embodiment of the present invention even after authentication has been propagated between terminals.

Figure 8A:
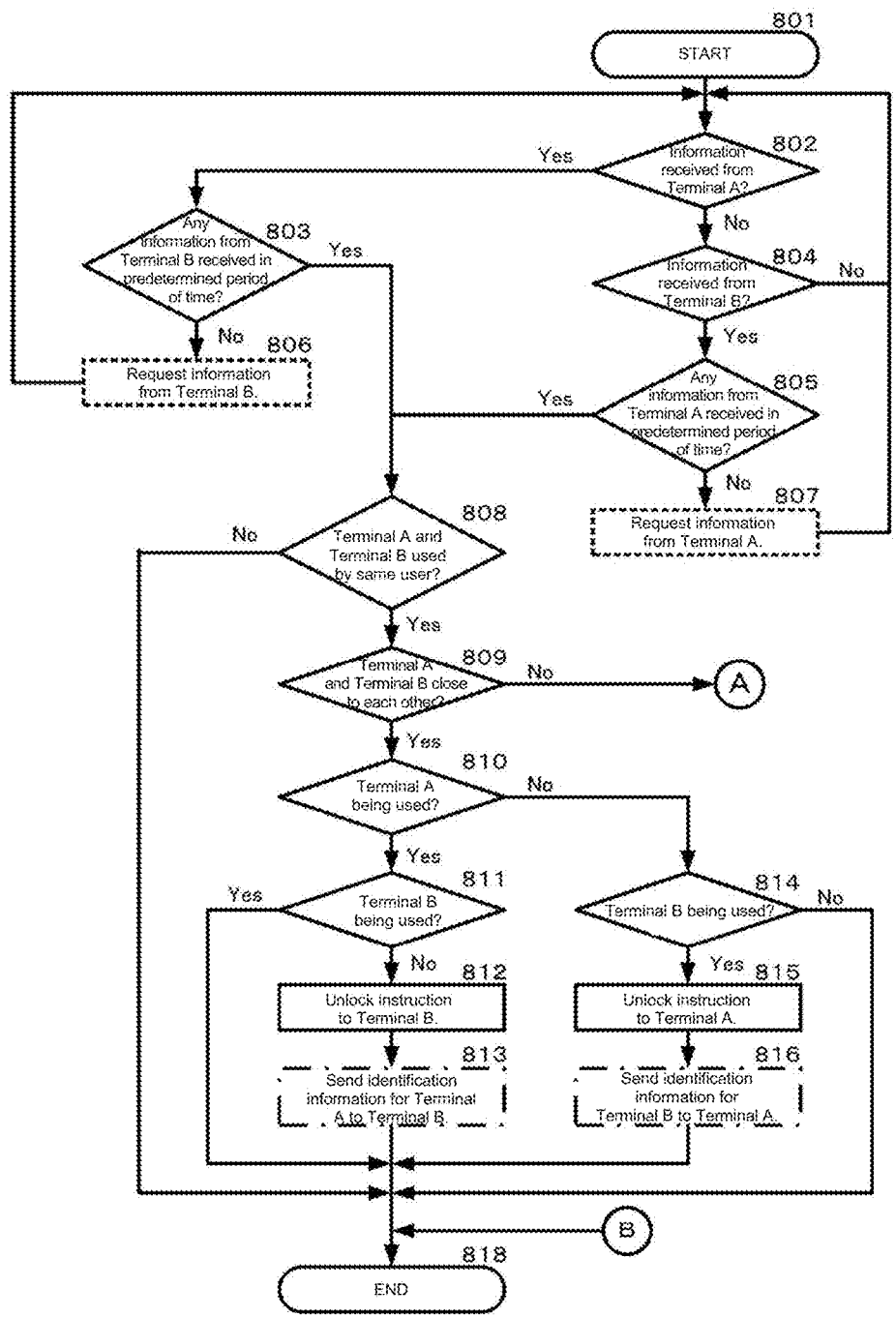
FIG. 8A is a flowchart of the processing executed by the server according to an embodiment of the present invention in order to propagate authentication between Terminal A and Terminal B connectable to the server via a network.
Figure 8B:
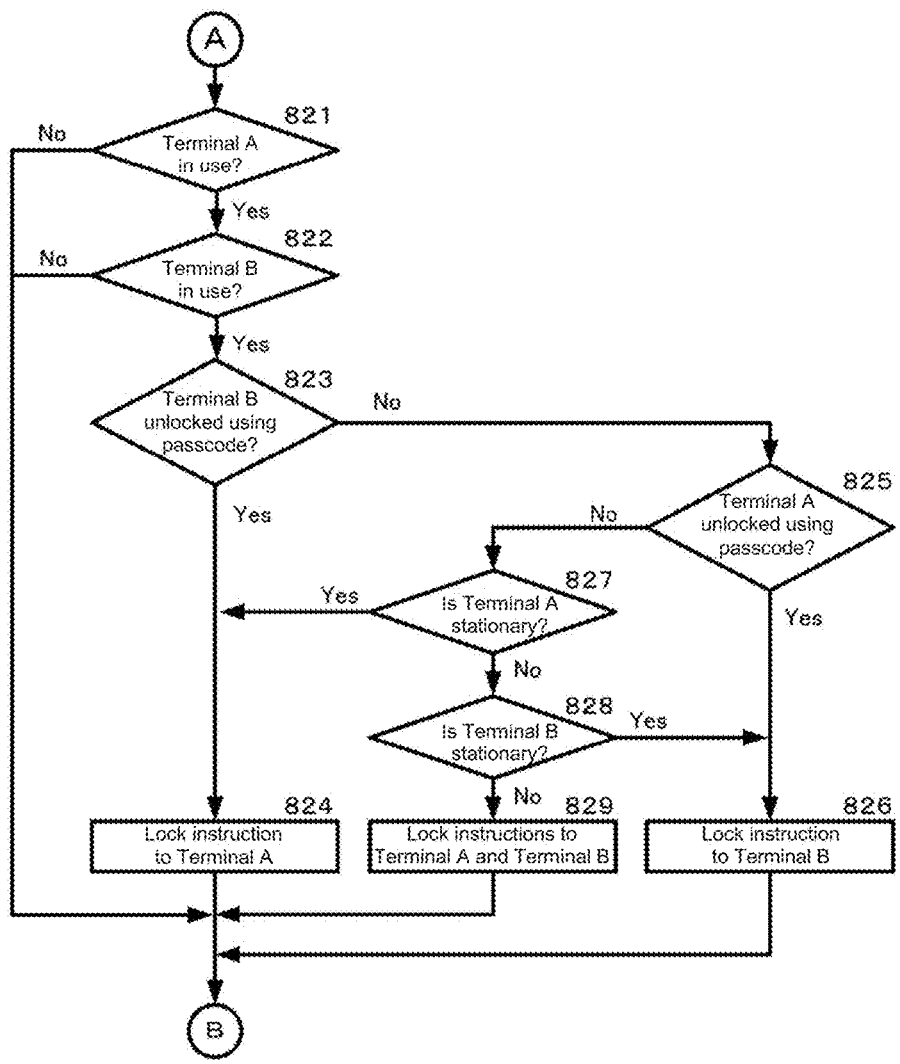
FIG. 8B is a flowchart of the processing executed by the server according to an embodiment of the present invention in order to propagate authentication between Terminal A and Terminal B connectable to the server via a network.
Figure 9:
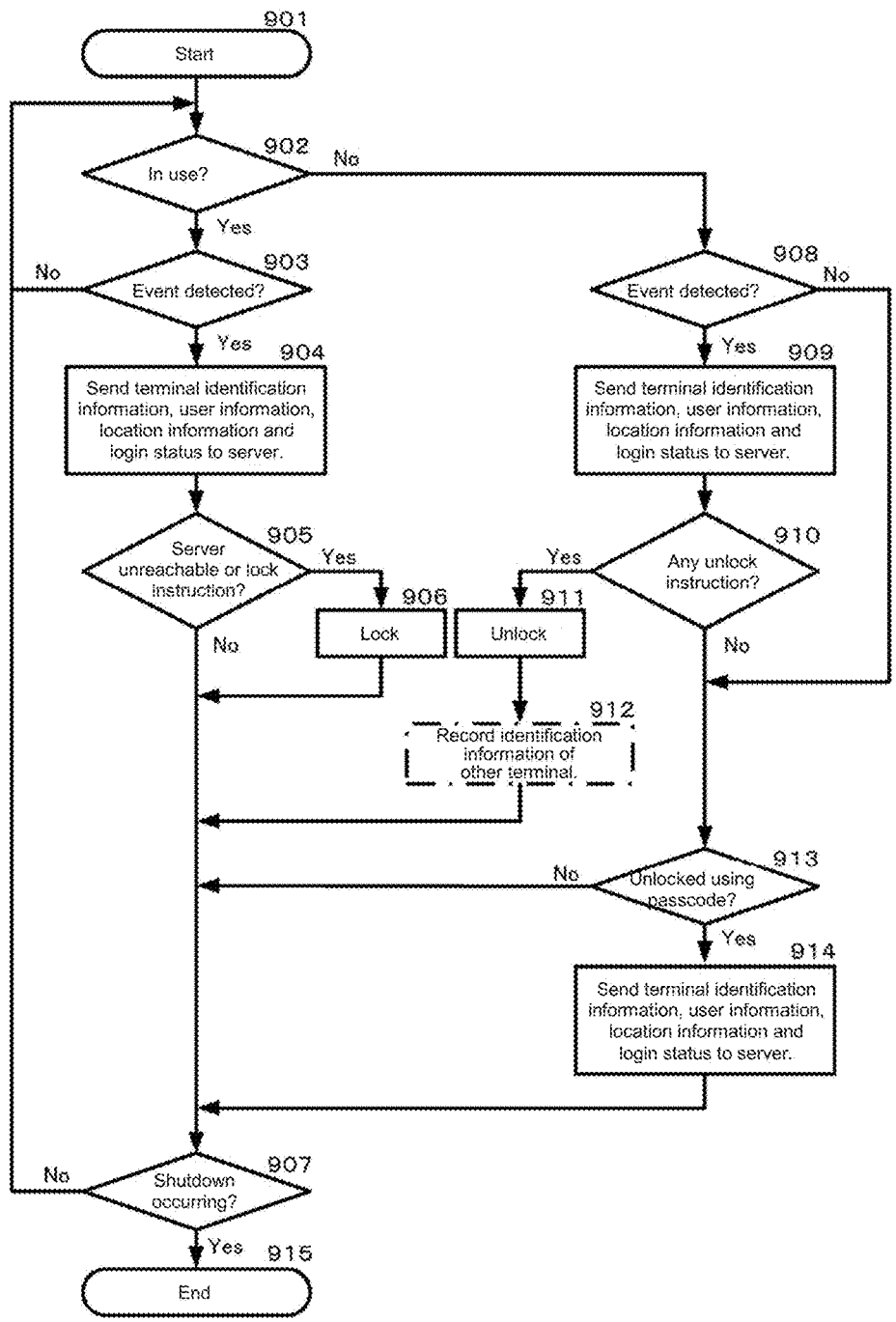
FIG. 9 is a flowchart of the processing executed by the terminals according to an embodiment of the present invention in order to propagate authentication between Terminal A and Terminal B connectable to the server via a network.

FIG. 8A and FIG. 8B show flowcharts of the processing performed by the server to propagate authentication in accordance with an embodiment of the present invention, and FIG. 9 shows a flowchart of the processing performed by each terminal in accordance with the embodiment of the present invention.

FIG. 8A and FIG. 8B show flowcharts of the processing performed by the server in accordance with an embodiment of the present invention in order to propagate authentication between Terminal A and Terminal B, which are connectable to the server.

In Step 801, the server (101) initiates the propagation of authentication between terminals.

In Step 802, the server (101) determines whether Terminal A has sent the identification information, user information, location information and the login status of Terminal A and optionally acceleration sensor information. When this information has been received, the server (101) advances the process to Step 803. When this information has not been received, the server (101) advances the process to Step 804.

In Step 803, the server (101) determines whether Terminal B has sent the identification information, user information, location information and the login status of Terminal B and optionally acceleration sensor information within a predetermined amount of time. This predetermined period of time may include time before and after information has been received from Terminal A in Step 802. When information has been received from Terminal B within the predetermined amount of time, the server (101) advances the process to Step 808. When information has not been received from Terminal B within the predetermined amount of time, the process returns to Step 806 or Step 802. Step 806 is executed only when information is requested from Terminal B.

In Step 804, the server (101) determines whether Terminal B has sent the identification information, user information, location information and the login status of Terminal B and optionally acceleration sensor information. When the information has been received, the server (101) advances the process to Step 805. When the information has not been received, the server (101) returns the process to Step 802.

In Step 805, the server (101) determines whether Terminal A has sent the identification information, user information, location information and the login status of Terminal A and optionally acceleration sensor information within a predetermined amount of time. This predetermined period of time may include time before and after information has been received from Terminal B in Step 804. In Step 805, it is assumed that there is something of a time lag between the time at which information is received from Terminal A in Step 805 and the time at which information is received from Terminal B in Step 804. In Step 805, when the time at which information was received from Terminal A in Step 805 and the time at which information was received from Terminal B in Step 804 is greater than a predetermined amount of time, there is a possibility that the event that occurred to Terminal A is different from the event that occurred to Terminal B. Therefore, the process does not advance to Step 808. When information has been received from Terminal B within the predetermined amount of time, the server (101) advances the process to Step 808. When information has not been received from Terminal B within the predetermined amount of time, the process returns to Step 807 or Step 802. Step 807 is executed only when this method has been requested of Terminal B.

In Step 806, the server (101) asks Terminal B to send information to the server (101).

In Step 807, the server (101) asks Terminal A to send information to the server (101).

In Step 808, the server (101) verifies whether the user information from Terminal A is in the management DB, and verifies whether the user of Terminal A is an authorized user. Similarly, the server (101) verifies whether the user information from Terminal B is in the management DB, and verifies whether the user of Terminal B is an authorized user. When the users of both Terminal A and Terminal B are authorized users, the server (101) compares the user information from Terminal A to the user information in Terminal B to determine whether the user of Terminal A and the user of Terminal B is the same user. When the user is the same, the server (101) advances the process to Step 809. When the user is not the same, the server (101) ends the process at Step 818.

In Step 809, the server (101) compares the location information from Terminal A and the location information from Terminal B to determine whether Terminal A and Terminal B are in close proximity to each other. When the terminals are in close proximity to each other, the server (101) advances the process to Step 810. When the terminals are not in close proximity to each other, the server (101) advances the process to Step 821 (see FIG. 8B).

In Step 810, the server (101) uses the login status from Terminal A to determine whether the Terminal A is unlocked (in use). When Terminal A is unlocked, the server (101) advances the process to Step 811. When Terminal A is not unlocked (that is, locked), the server (101) advances the process to Step 814.

In Step 811, the server (101) uses the login status from Terminal B to determine whether the Terminal B is unlocked (in use). When Terminal B is not unlocked, the server (101) advances the process to Step 812. When Terminal B is unlocked, the server (101) advances the process to Step 818. The process is ended in the latter case because both Terminal A and Terminal B do not have to be locked due to the requirements being met: Terminal A and Terminal B are used by the same user, Terminal A and Terminal B are in close proximity to each other, and Terminal A and Terminal B are unlocked.

Because Terminal B is locked, the server (101) sends an unlock instruction to Terminal B in Step 812. Terminal B is unlocked in Step 812 because the requirements have been satisfied: the user of Terminal A and Terminal B is the same, Terminal A and Terminal B are in close proximity to each other, Terminal A is unlocked, and Terminal B is locked.

In Step 813, the server (101) sends to Terminal B the identification information for Terminal A received from Terminal A. Step 813 is only executed when the terminals have been determined to be in close proximity to each other. Therefore, when the terminals have not been determined to be in close proximity to each other, the server (101) skips Step 813 and ends the process at Step 818.

In Step 814, the server (101) uses the login status from Terminal B to determine whether the Terminal B is unlocked (in use). When Terminal B is unlocked, the server (101) advances the process to Step 815. When Terminal B is not unlocked (that is, locked), the server (101) advances the process to Step 818. The process is ended in the latter case because both Terminal A and Terminal B do not have to be unlocked as Terminal A and Terminal B are used by the same user, and Terminal A and Terminal B are in close proximity to each other, but Terminal A and Terminal B are both not unlocked.

Because Terminal A is locked, the server (101) in Step 815 sends an unlock instruction to Terminal A. In Step 815, Terminal A is unlocked because the requirements are met: Terminal A and Terminal B are used by the same user, Terminal A and Terminal B are in close proximity to each other, Terminal A is locked, and Terminal B is unlocked.

In Step 816, the server (101) sends to Terminal A the identification information of Terminal B received from Terminal B. Step 816 is only executed when the terminals have been determined to be in close proximity to each other. Therefore, when the terminals have not been determined to be in close proximity to each other, the server (101) skips Step 816 and ends the process at Step 818.

In Step 821, the server (101) uses the login status of Terminal A to determine whether or not Terminal A is unlocked (in use). When Terminal A is unlocked, the server (101) advances the process to Step 822. When Terminal A is not unlocked (that is, locked), the server (101) ends the process at Step 818.

In Step 822, the server (101) uses the login status of Terminal B to determine whether or not Terminal B is unlocked (in use). When Terminal B is unlocked, the server (101) advances the process to Step 823. When Terminal B is not unlocked (that is, locked), the server (101) ends the process at Step 818.

In Step 823, the server (101) determines whether or not Terminal B has been unlocked by the user entering the password into Terminal B itself. When it has been unlocked in this way, the server (101) advances the process to Step 824. When it has not been unlocked in this way, the server (101) advances the process to Step 825.

Because Terminal A is unlocked, the server (101) in Step 824 sends a lock instruction to Terminal A. There is a possibility that Terminal A is being carried away by an unauthorized user when the following conditions are satisfied: the user of Terminal A and Terminal B is the same, Terminal A and Terminal B are not close to each other (that is, Terminal A and Terminal B are separated by a predetermined distance), Terminal A and Terminal B are unlocked, and Terminal B was unlocked by the user entering the password in the terminal. Therefore, Terminal A has to be locked as a security precaution. The server (101) sends a lock instruction to Terminal A and then ends the process at Step 818.

In Step 825, the server (101) determines whether or not Terminal A has been unlocked by the user entering the password into Terminal A itself. When it has been unlocked in this way, the server (101) advances the process to Step 826. When it has not been unlocked in this way, the server (101) advances the process to Step 827.

Because Terminal B is unlocked, the server (101) in Step 826 sends a lock instruction to Terminal B. There is a possibility that Terminal B is being carried away by an unauthorized user when the following conditions are satisfied: the user of Terminal A and Terminal B is the same, Terminal A and Terminal B are not close to each other (that is, Terminal A and Terminal B are separated by a predetermined distance), Terminal A and Terminal B are unlocked, and Terminal A was unlocked by the user entering the password in the terminal. Therefore, Terminal B has to be locked as a security precaution. The server (101) sends a lock instruction to Terminal B and then ends the process at Step 818.

In Step 827, the server (101) determines whether or not Terminal A is stationary. When Terminal A is stationary, the server (101) responds by advancing the process to Step 824. When Terminal A is not stationary, the server (101) responds by advancing the process to Step 828. There is a possibility that the user has moved away from Terminal A when the following conditions are satisfied: the user of Terminal A and Terminal B is the same, Terminal A and Terminal B are not close to each other (that is, Terminal A and Terminal B are separated by a predetermined distance), Terminal A and Terminal B are unlocked, and Terminal A is stationary. Therefore, the server (101) sends a lock instruction to stationary Terminal A (Step 824).

In Step 828, the server (101) determines whether or not Terminal B is stationary. When Terminal B is stationary, the server (101) responds by advancing the process to Step 826. When Terminal B is not stationary, the server (101) responds by advancing the process to Step 829. There is a possibility in the former case that the user has moved away from Terminal B when the following conditions are satisfied: the user of Terminal A and Terminal B is the same, Terminal A and Terminal B are not close to each other (that is, Terminal A and Terminal B are separated by a predetermined distance), Terminal A and Terminal B are unlocked, and Terminal B is stationary. Therefore, the server (101) sends a lock instruction to stationary Terminal B (Step 826).

In Step 829, the server (101) assumes that different people have carried off Terminal A and Terminal B when the following conditions are satisfied: the user of Terminal A and Terminal B is the same, Terminal A and Terminal B are not close to each other (that is, Terminal A and Terminal B are separated by a predetermined distance), Terminal A and Terminal B are unlocked, and Terminal A and Terminal B are both moving. Therefore, the server (101) sends a lock instruction to Terminal A (502) and Terminal B (503). In Step 818, the server (101) ends the process for propagating authentication between terminals.

FIG. 9 shows a flowchart of the processing according to an embodiment of the present invention which is performed by the terminals in order to propagate authentication between Terminal A and Terminal B connectable to the server via a network.

In Step 901, a terminal initiates the processing for propagating authentication between terminals.

In Step 902, the terminal determines whether the terminal itself is unlocked (in use). When the terminal is unlocked, the terminal responds by advancing the process to Step 903. When the terminal is not unlocked, the terminal responds by advancing the terminal to Step 908.

In Step 903, the terminal determines whether or not an event has been detected. Events include detecting an impact (collision or contact), terminals coming within a predetermined distance of each other, the start of a timer, changing network conditions, receiving a request for information from the server, or an inability to detect a nearby terminal propagating authentication or terminal receiving the propagated authentication. When an event has been detected, the terminal responds by advancing the process to Step 904. When an event has not been detected within a predetermined period of time, the terminal returns the process to Step 902.

In response to detecting an event in Step 903, the terminal in Step 904 sends identification information, user information, location information and the login status of the terminal, and optionally acceleration sensor information, to the server (101).

In Step 905, the terminal determines whether or not an acknowledge signal has been received from the server for the information sent in Step 904 (that is, whether the server received the information) or whether a lock instruction has been sent from the server. When an acknowledge signal has not been received (the server was unreachable) or a lock instruction was received from the server, the terminal responds by advancing the process to Step 906. When an acknowledge signal has been received (the terminal was reached) or a lock instruction was not received from the server, the terminal responds by advancing the process to Step 907.

When an acknowledgement signal was not received (the server was unreachable), the terminal responds in Step 906 by locking itself. When a lock instruction was received, the terminal responds in Step 906 by locking itself.

In Step 907, the terminal determines whether or not the terminal itself is shutting down. When the terminal is shutting down, the terminal responds by advancing the process to Step 915. When the terminal is not shutting down, the terminal returns to Step 902.

In Step 908, the terminal determines whether or not an event was detected. Events include any of the events described above with reference to Step 903. When an event has been detected, the terminal responds by advancing the process to Step 909. When an event has not been detected within a predetermined period of time, the terminal responds by advancing the process to Step 913.

When an event was detected in Step 908, the terminal responds in Step 909 by sending identification information, user information, location information, the login status of the terminal, and optionally acceleration sensor information to the server (101).

In Step 910, the terminal determines whether or not an unlock instruction has been sent from the server. When an unlock instruction has been received from the server, the terminal responds by advancing the process to Step 911. When an unlock instruction has not been received from the server, the terminal responds by advancing the process to Step 913.

When an unlock instruction has been received from the server, the terminal responds in Step 911 by unlocking itself.

In Step 912, the terminal receives identification information for the other terminal (the terminal propagating authentication or the terminal receiving the propagated authentication), and records this information inside the terminal. Step 912 is executed only when it has been determined that the terminals are in close proximity to each other. Therefore, when the terminals are not in close proximity to each other, the terminal skips Step 912 and advances the process to Step 907.

In Step 913, the terminal determines whether or not the terminal itself has been unlocked by the user entering a password. When the terminal has been unlocked in this manner, the terminal responds by advancing the process to Step 914. When the terminal has not been unlocked in this manner, the terminal responds by advancing the process to Step 907.

When the terminal was unlocked in Step 913, the terminal responds in Step 914 by sending identification information, user information, location information, the login status of the terminal, and optionally acceleration sensor information to the server (101).

In Step 915, the terminal ends the process for propagating authentication between terminals.

Figures 10A, 10B:
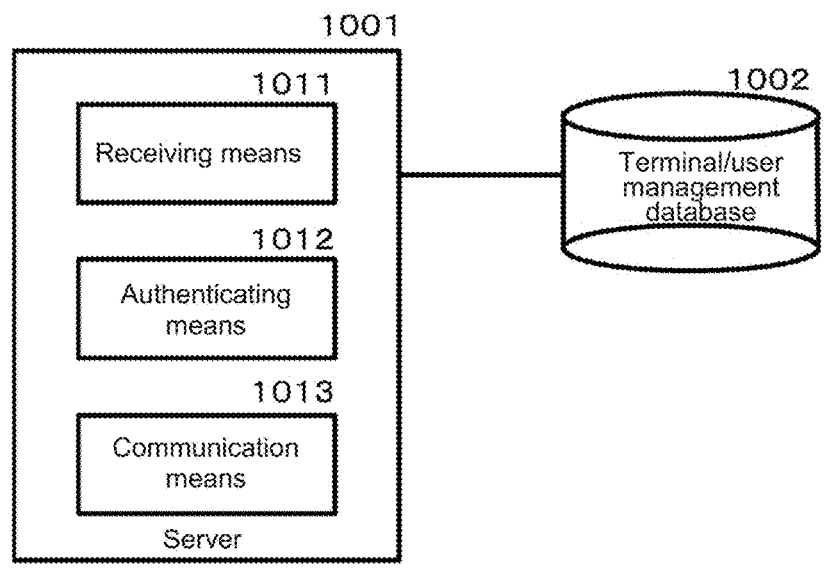
FIG. 10A is a function block diagram of a server for propagating authentication between terminals according to an embodiment of the present invention, the server preferably having the hardware configuration shown in FIG. 1.
FIG. 10B is an example of content in a terminal/user management database which is available to the server in FIG. 10A and which may be used in accordance with an embodiment of the present invention.

FIG. 10A is a function block diagram of a server for propagating authentication between terminals according to an embodiment of the present invention, the server preferably having the hardware configuration shown in FIG. 1. The server (1001) has a receiving means (1011), an authenticating means (1012) and a communication means (1013). Also, the server (1001) has a terminal/user management database (1002). The management database (1002) may be installed in a storage device inside the server (1001), a storage device connected to the server (1001), or a storage device accessible from the server (1001) via a network (for example, NAS, a data storage server, or a cloud server).

When there has been a predetermined impact between Terminal A and Terminal B or Terminal A and Terminal B are within a predetermined distance of each other, the receiving means (1011) responds by receiving identification information, user information, location information, and the login status of the terminal (authenticated or unauthenticated), and optionally acceleration sensor information.

The authenticating means (1012) authenticates Terminal B in response to the user of Terminal A being among the users of Terminal B on the basis of the identification information and the user information, Terminal A and Terminal B being within a predetermined range on the basis of the location information, and Terminal A being authenticated and Terminal B being unauthenticated according to the login status of each.

When the server (1001) has information for authenticating Terminal B, the authenticating means (1012) sends the information from the server (1001) to Terminal B. Alternatively, when Terminal B has encrypted information for authenticating Terminal B, the authenticating means (1012) sends a password for decrypting the encrypted information (for example, an encrypted password) from the server (1001) to Terminal B. The same is performed in the case of Terminal A.

After Terminal B has been authenticated, when either of Terminal A and Terminal B moves but the other remains stationary, the authenticating means (1012) responds by maintaining the authentication of the moving terminal and deauthenticating the stationary terminal. After maintaining the authentication of the moving terminal and deauthenticating the stationary terminal, the authenticating means (1012) may deauthenticate the moving terminal if the stationary terminal is authenticated by a user entering authentication information into the stationary terminal. Entry of authentication information into the stationary terminal may include the user directly entering authentication information into the terminal or the user bringing an authenticating IC card associated with the user (such as FeliCa (registered trademark) into contact with or in close proximity to the terminal. One example of an authentication control technique using an IC card is Tivoli Access Manager for Enterprise Single Sign-on (TAM ESSO). TAM ESSO is explained in greater detail in "FeliCa/USB Token Authentication Solutions for TAM ESSO," published by International Business Machines Corp.

If, after Terminal B has been authenticated, Terminal A and Terminal B both move apart by a predetermined distance, the authenticating means (1012) may respond by deauthenticating both Terminal A and Terminal B.

If, after Terminal B has been authenticated, Terminal A and Terminal B both move closer to each other or in tandem, the authenticating means (1012) may respond by maintaining the authentication of both Terminal A and Terminal B.

If, after Terminal B has been authenticated, Terminal A does not send location information or its login status to the server (1001), the authenticating means (1012) may respond by having Terminal A deauthenticate itself. More specifically, the authenticating means (1012) responds to Terminal A not sending location information or its login status to the server (1001) while Terminal A is moving by having Terminal A deauthenticate Terminal A itself.

If, after Terminal B has been authenticated, Terminal B does not send location information or its login status to the server (1001), the authenticating means (1012) may respond by having Terminal B deauthenticate itself. More specifically, the authenticating means (1012) responds to Terminal B not sending location information or its login status to the server (1001) while Terminal B is moving by having Terminal B deauthenticate Terminal B itself.

When Terminal A and Terminal B have different security levels, the authenticating means (1012) may allow the terminal with the higher security level to propagate authentication to the terminal with the lower security level, but not allow the terminal with the lower security level to propagate authentication to the terminal with the higher security level.

The communication means (1013) is a communication interface used to connect each terminal via a network so that the terminals can exchange information.

FIG. 10B is an example of content in a terminal/user management database which is available to the server in FIG. 10A and which may be used in accordance with an embodiment of the present invention. The management DB (1002) may have identification information for each terminal, and user information associated with the identification information for each terminal. In FIG. 10B, the management DB (1002) is a table. However, the data storage format is not limited to a table. Any technique may be employed.

The management DB (1002) includes identification numbers for five terminals (1031, 1032, 1033, 1034 and 1035) and user information associated with each identification number.

Because the user information associated with identification number (1031) is "User A", and the user information associated with identification number (1032) is "User A", the user of the terminal with identification number (1031) (completely) matches the user of the terminal with identification number (1032).

Because the user information associated with identification number (1031) is "User A", and the user information associated with identification number (1033) is "Users A, B", the user of the terminal with identification number (1031) partially matches the users of the terminal with identification number (1033).

Because the user information associated with identification number (1031) is "User A", and the user information associated with identification number (1034) is "Group 1" (including Users A, B, C and D), the user of the terminal with identification number (1031) partially matches the users of the terminal with identification number (1034).

Because the user information associated with identification number (1031) is "User A", and the user information associated with identification number (1035) is "User B", the user of the terminal with identification number (1031) does not match the user of the terminal with identification number (1035).

Figure 11A:
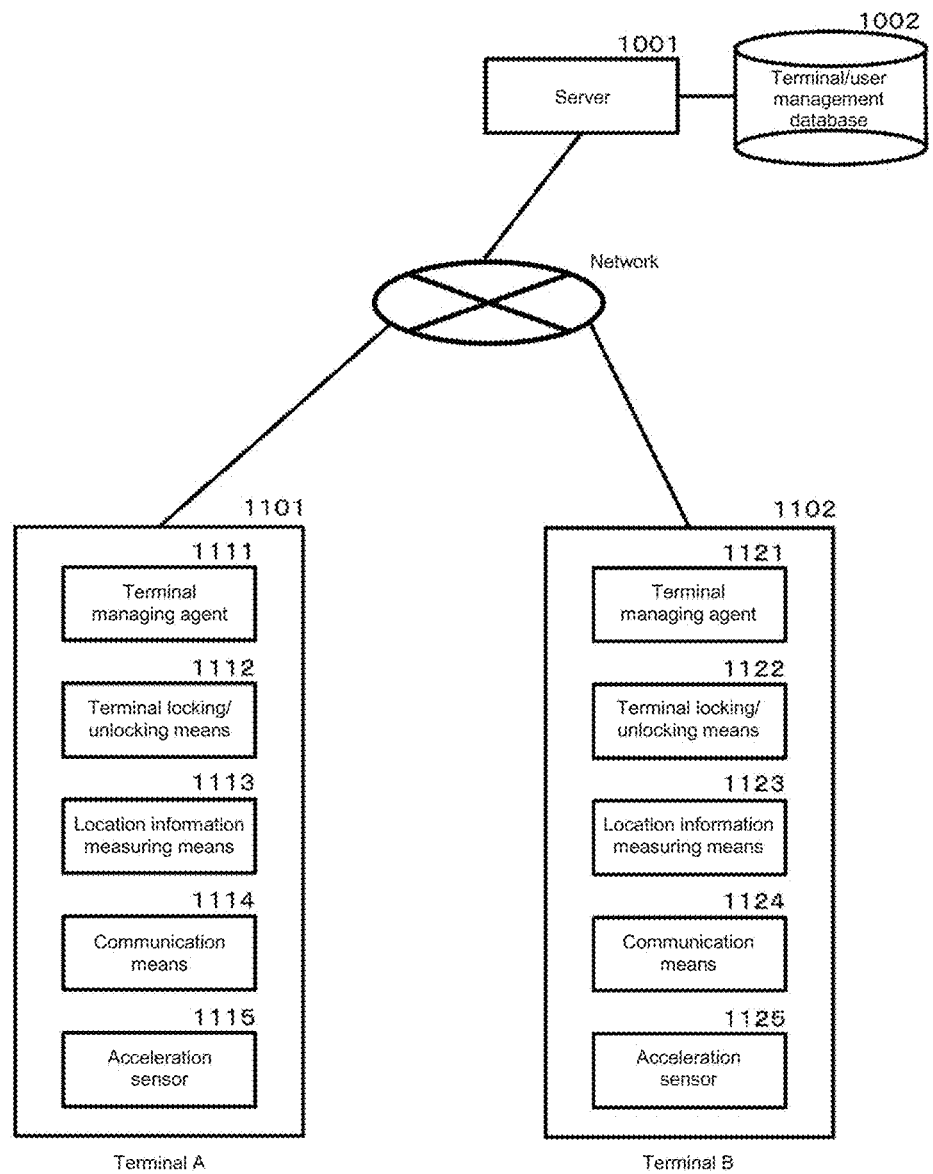
FIG. 11A is a function block diagram of a terminal which may be used in accordance with an embodiment of the present invention.

FIG. 11A is a function block diagram of a terminal which may be used in accordance with an embodiment of the present invention. Terminal A (1101) and Terminal B (1102) can be connected to the server (1001) via a network.

Terminal A (1101) has a terminal managing agent (1111), a terminal locking/unlocking means (1112), a location information measuring means (1113), and a communication means (1114). Terminal A may also have an acceleration sensor (1115).

Terminal B (1102) has a terminal managing agent (1121), a terminal locking/unlocking means (1122), a location information measuring means (1123), and a communication means (1124). Terminal B may also have an acceleration sensor (1125).

Using Terminal A (1101) as the representative example, the following is an explanation of each means in Terminal A (1101).

The terminal managing agent (1111) detects events that occur to the terminal (1101). When an event occurs, the terminal (1101) responds by sending the identification information, user information, location information, login status and, optionally, the acceleration sensor information of the terminal to the server (1001).

The terminal locking/unlocking means (1112) receives a locking instruction or unlocking instruction from the server (1001), and locks or unlocks the terminal.

The location information measuring means (1113) may be the Global Positioning System (GPS) or a means for acquiring the location information of the access point (such as a wireless LAN access point) used to connect to the network.

The communication means (1114) is a communication interface used to connect each terminal via a network to exchange information with the server (1001).

The acceleration sensor means (1115) may be a mechanical, optical or semiconductor acceleration sensor. The acceleration sensor means (1115) detects any impact sustained by the terminal. When an impact is detected, the acceleration sensor means (1115) detects the acceleration caused by the impact.

Figure 11B:
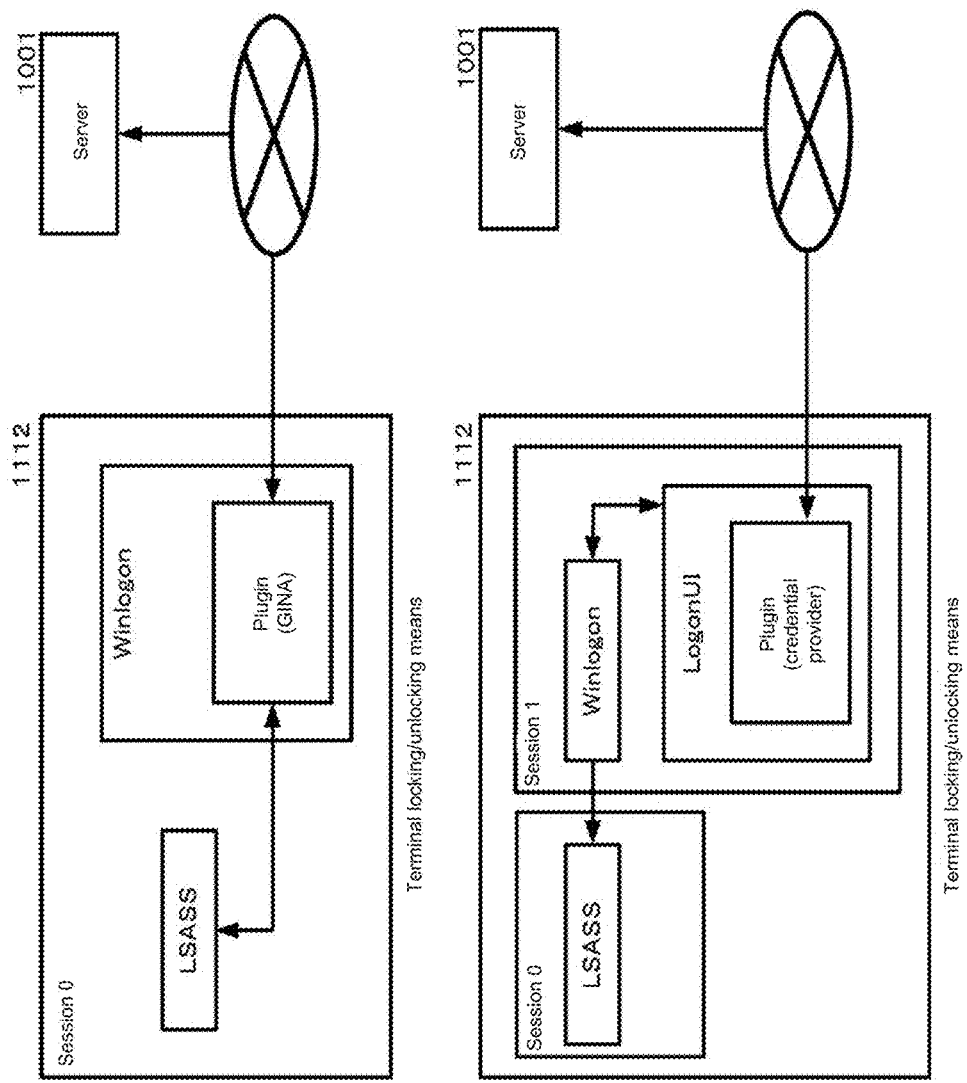
FIG. 11B is a function block diagram of the login/log-off remote control steps for a terminal which may be used in accordance with an embodiment of the present invention.

FIG. 11B is a function block diagram of the login/log-off remote control steps for a terminal which may be used in accordance with an embodiment of the present invention. The terminal locking/unlocking means (1112) in Terminal (1112) may also include a control means which realizes login/logoff remote control from the server. The control means may be realized by a logon management module supporting a plugin for vendor-specific authentication instead of the standard authentication method used by the operating system (for example, entering a user ID and password).

For example, the login management modules in Microsoft Windows (registered trademark) are winlogon.exe and lsass.exe.

The control means shown at the bottom of FIG. 11B may be one that can be used with the Windows (registered trademark) 2000 (registered trademark) operating system or the Windows (registered trademark) XP (registered trademark) operating system. This control means is known as GINA (Graphical Identification aNd Authentication). GINA is described in greater detail in "Security Briefs: Customizing GINA, Part 1," published by Microsoft, Inc.

The control means shown at the bottom of FIG. 11B may be one that can be used with the Windows (registered trademark) Vista (registered trademark) operating system or a later version of the Windows (registered trademark) operating system. This control means is known as a "credential provider". Credential providers are described in greater detail in "Custom Login Experiences: Credential Providers in Windows Vista," published by Microsoft, Inc.

The terminal locking/unlocking means (1112) connects the communication means (1114) for communication with the server (1001) to a GINA or credential provider, and can automatically login and logoff Terminal A (1101) or control the screen lock in response to a lock or unlock instruction from the server.

The terminal locking/unlocking means (1112) receives the information required for authentication (for example, a passcode) from the server (1001), or may encrypt and store this information in the local storage of Terminal A (1101).

The invention claimed is:

1. A method for propagating authentication between a plurality of terminals connected to a server via a network, the server having identification information for each of the plurality of terminals and user information for the terminals, the method comprising:
   receiving, by the server, identification information, user information, location information and a login status from each of a first terminal and a second terminal in response to a predetermined impact between the first terminal and the second terminal, or the first terminal and the second terminal coming within a predetermined distance of each other, wherein the login status of the first terminal is authenticated and the login status of the second terminal is unauthenticated; and
   authenticating, by the server, the second terminal in response to the users of the first terminal matching some or all of the users of the second terminal on the basis of the identification information and user information, in response to the first terminal and the second terminal being located within a predetermined distance of each other on the basis of the location information.

2. The method according to claim 1, further comprising:
   in response to the first terminal moving and the second terminal remaining stationary, or the second terminal moving and the first terminal remaining stationary, maintaining, by the server, the authentication of the moving one of the first or second terminal and rendering the stationary one of the first or second terminal unauthenticated.

3. The method according to claim 1, further comprising:
   rendering, by the server, the first terminal and the second terminal unauthenticated in response to both the first terminal and the second terminal moving apart from each other by a predetermined distance.

4. The method according to claim 1, further comprising:
   maintaining, by the server, the authentication of the first terminal and the second terminal in response to the first terminal and the second terminal being close to each other or moving in tandem.

5. The method according to claim 1, wherein receiving further comprises:
   receiving acceleration sensor information from each of the first terminal and the second terminal in response to a predetermined impact between the first terminal and the second terminal.

6. The method according to claim 1, wherein the impact occurs when the first terminal and second terminal come into contact or collide with each other.

7. The method according to claim 1, wherein the predetermined distance is the range in which the second terminal detects the first terminal using radio frequency identification (RFID), infrared or ultrasound.

8. The method according to claim 1, wherein the predetermined distance is the range in which the first terminal and the second terminal are able to communicate with each other via a wireless communication device.

9. The method according to claim 1, wherein the predetermined distance is the range in which the first terminal reads a barcode displayed on a screen of the second terminal.

10. The method according to claim 9, wherein receiving further comprises:
    causing, by the first terminal, a barcode to be displayed on the screen of the second terminal; and
    reading, by the first terminal, the barcode information displayed on the screen of the second terminal;
    wherein authenticating further comprises:
    authenticating the second terminal if the barcode information read by the first terminal that is displayed on the screen of the second terminal matches the barcode information caused by the first terminal to be displayed on the screen of the second terminal.

11. The method according to claim 1, wherein the users of the first terminal match some or all of the users of the second terminal, and the user of the first terminal is the same as the user of the second terminal.

12. The method according to claim 1, wherein the users of the first terminal match some or all of the users of the second terminal, and the user of the first terminal and the user of the second terminal belong to the same group.

13. The method according to claim 1, wherein authenticating further comprises:
    sending information from the server to the second terminal when the server has information for authenticating the second terminal, or
    sending information for decrypting encrypted information from the server to the second terminal when the second terminal has encrypted information for authenticating the second terminal.

14. The method according to claim 1, further comprising:
    rendering, by the first terminal, the first terminal unauthenticated in response to the first terminal becoming unable to send location information or login status information to the server.

15. The method according to claim 1, further comprising:
    in response to the first terminal no longer being able to send location information and login status information to the server while the first terminal is moving, rendering, by the first terminal, the first terminal unauthenticated.

16. The method according to claim 1, further comprising:
    in response to the second terminal becoming unable to send location information or login status information to the server, rendering, by the second terminal, the second terminal unauthenticated.

17. The method according to claim 1, further comprising:
    in response to the second terminal no longer being able to send location information and login status information to the server while the second terminal is moving, rendering, by the second terminal, the second terminal unauthenticated.

* * * * *